United States Patent
Lee et al.

(10) Patent No.: US 12,260,918 B2
(45) Date of Patent: Mar. 25, 2025

(54) MEMORY DEVICES AND METHODS OF PROCESSING SECURITY DATA THEREOF

(71) Applicant: Samsung Electronics Co., Ltd., Suwon-si (KR)

(72) Inventors: Yoo-jung Lee, Hwaseong-si (KR);
Jang-seok Choi, Seongnam-si (KR);
Duk-sung Kim, Hwaseong-si (KR);
Hyun-joong Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/712,579

(22) Filed: Apr. 4, 2022

(65) Prior Publication Data
US 2022/0230688 A1      Jul. 21, 2022

Related U.S. Application Data

(63) Continuation of application No. 16/529,100, filed on Aug. 1, 2019, now abandoned.

(30) Foreign Application Priority Data

Dec. 4, 2018    (KR) ........................ 10-2018-0154693

(51) Int. Cl.
| | | |
|---|---|---|
| *G11C 16/22* | (2006.01) | |
| *G06F 12/14* | (2006.01) | |
| *G06F 21/45* | (2013.01) | |
| *G06F 21/62* | (2013.01) | |
| *G06F 21/79* | (2013.01) | |
| *G11C 7/24* | (2006.01) | |

(Continued)

(52) U.S. Cl.
CPC .......... *G11C 16/22* (2013.01); *G06F 12/1466* (2013.01); *G06F 21/45* (2013.01); *G06F 21/62* (2013.01); *G06F 21/79* (2013.01); *G11C 7/24* (2013.01); *G11C 11/1655* (2013.01); *G11C 11/1657* (2013.01); *G11C 11/4078* (2013.01); *G11C 11/409* (2013.01); *G11C 16/08* (2013.01); *G11C 16/26* (2013.01)

(58) Field of Classification Search
CPC ...... G06F 12/1466; G06F 21/45; G06F 21/62; G06F 21/79; G06F 12/1441; G06F 12/1475; G06F 21/75; G11C 16/22; G11C 7/24; G11C 11/1655; G11C 11/1657; G11C 11/4078; G11C 11/409; G11C 16/08; G11C 16/26; G11C 8/20
USPC ................................................ 711/164, 163
See application file for complete search history.

(56) References Cited

U.S. PATENT DOCUMENTS

| | | | | |
|---|---|---|---|---|
| 5,905,993 A * | 5/1999 | Shinohara | ........... | G06F 12/0292 711/171 |
| 7,426,644 B1 * | 9/2008 | Strongin | ............. | G06F 12/1441 713/193 |
| 8,127,048 B1 * | 2/2012 | Merry | .................... | G06F 3/0604 710/36 |

(Continued)

FOREIGN PATENT DOCUMENTS

KR      20110104481 A    9/2011

*Primary Examiner* — Hosain T Alam
*Assistant Examiner* — Zubair Ahmed
(74) *Attorney, Agent, or Firm* — Myers Bigel, P.A.

(57) ABSTRACT

A memory device includes: a memory cell array including a security region configured to store security data; and a security management circuit configured to store a guard key and, responsive to receiving a data operation command for the security region, limit a data operation for the security region by comparing the guard key with an input password that is received by the memory device.

20 Claims, 20 Drawing Sheets

(51) Int. Cl.
*G11C 11/16* (2006.01)
*G11C 11/4078* (2006.01)
*G11C 11/409* (2006.01)
*G11C 16/08* (2006.01)
*G11C 16/26* (2006.01)

(56) References Cited

U.S. PATENT DOCUMENTS

| | | | |
|---|---|---|---|
| 8,452,934 B2 | 5/2013 | Jogand-Coulomb et al. | |
| 9,183,402 B2 | 11/2015 | Rodgers et al. | |
| 9,317,450 B2 | 4/2016 | Rudelic et al. | |
| 9,575,904 B2 | 2/2017 | Chinnakkonda Vidyapoornachary et al. | |
| 9,589,158 B2 | 3/2017 | Pandya | |
| 10,460,088 B2* | 10/2019 | Oka | G06F 3/0622 |
| 2007/0101158 A1 | 5/2007 | Elliott | |
| 2008/0189557 A1* | 8/2008 | Pipitone | G06F 12/1425 |
| | | | 713/193 |
| 2008/0209117 A1* | 8/2008 | Kajigaya | G06F 12/1433 |
| | | | 711/E12.001 |
| 2008/0221396 A1* | 9/2008 | Garces | A61M 1/0286 |
| | | | 600/300 |
| 2008/0235772 A1* | 9/2008 | Janzen | H04L 9/3226 |
| | | | 726/5 |
| 2009/0249014 A1* | 10/2009 | Obereiner | G06F 12/1441 |
| | | | 711/163 |
| 2011/0072194 A1* | 3/2011 | Forhan | G06F 12/0246 |
| | | | 711/170 |
| 2014/0007177 A1 | 1/2014 | Buck et al. | |
| 2014/0026232 A1* | 1/2014 | Lee | G06F 12/14 |
| | | | 726/30 |
| 2014/0053278 A1 | 2/2014 | Dellow | |
| 2014/0176187 A1* | 6/2014 | Jayasena | G06F 15/7867 |
| | | | 326/39 |
| 2014/0289488 A1* | 9/2014 | Connolly | G06F 21/79 |
| | | | 711/163 |
| 2016/0246737 A1 | 8/2016 | Mchodes et al. | |
| 2016/0253272 A1 | 9/2016 | Chinnakkonda Vidyapoornachary et al. | |
| 2016/0291891 A1 | 10/2016 | Cheriton | |
| 2017/0185539 A1 | 6/2017 | Xu | |
| 2018/0143777 A1* | 5/2018 | Dasu | G06F 3/061 |

* cited by examiner

MEMORY DEVICES AND METHODS OF PROCESSING SECURITY DATA THEREOF

CROSS-REFERENCE TO RELATED APPLICATIONS

The present application is a continuation of and claims priority to U.S. patent application Ser. No. 16/529,200 filed Aug. 1, 2019, which in turn claims the benefit under 35 U.S.C § 119 to Korean Patent Application No. 10-2018-0154693, filed on Dec. 4, 2018, in the Korean Intellectual Property Office, and the entire contents of the above-identified applications are incorporated herein by reference.

BACKGROUND

The inventive concepts relate to memory devices and methods of processing security data thereof, and more particularly, to memory devices including a security management circuit and to methods of processing security data thereof.

Semiconductor memory devices may be classified into volatile memory devices that lose stored data when power is interrupted and non-volatile memory devices that do not lose stored data when power is interrupted. Although volatile memory devices have high reading and writing rates, content stored therein disappears when external power supplied thereto is shut off. On the other hand, although non-volatile memory devices have lower reading and writing rates than volatile memory devices, content stored therein is preserved even though external power supplied thereto is shut off.

To protect data requiring security, security solutions based on various techniques are being developed, and in particular, recently, there has been an increasing demand for security solutions not relying on processors such as central processing units (CPUs).

SUMMARY

The inventive concepts provide memory devices and methods of processing security data of the memory devices, and in particular, the inventive concepts provide methods and devices for processing security data by a memory device itself without a separate processor for a security solution.

According to an aspect of the inventive concepts, there is provided a memory device including: a memory cell array including a security region that is configured to store security data; and a security management circuit configured to store a guard key and, responsive to receiving a data operation command for the security region, limit a data operation for the security region by comparing the guard key with an input password that is received by the memory device.

According to another aspect of the inventive concepts, there is provided a method of processing security data of a memory device, the method including: receiving an input password; comparing the received input password with a guard key stored in the memory device; receiving security data, a data operation command for the security data, and an address corresponding to a security region of a memory cell array; responsive to the guard key being consistent with the received input password, performing a data operation on the security data based on the data operation command and the address; and responsive to the guard key being inconsistent with the received input password, limiting the data operation for the security data.

According to yet another aspect of the inventive concepts, there is provided a memory device including: a memory cell array including a first memory region, in which non-secured data is stored, and a second memory region, in which security data is stored; and a security management circuit configured to store a guard key, receive an input password, and control the memory device such that, responsive to receiving a data operation command for the second memory region, the memory device is configured to perform a data operation on the second memory region only when the input password is consistent with the guard key.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Hereinafter, embodiments of the inventive concepts will be described in detail with reference to the accompanying drawings.

Figure 1:
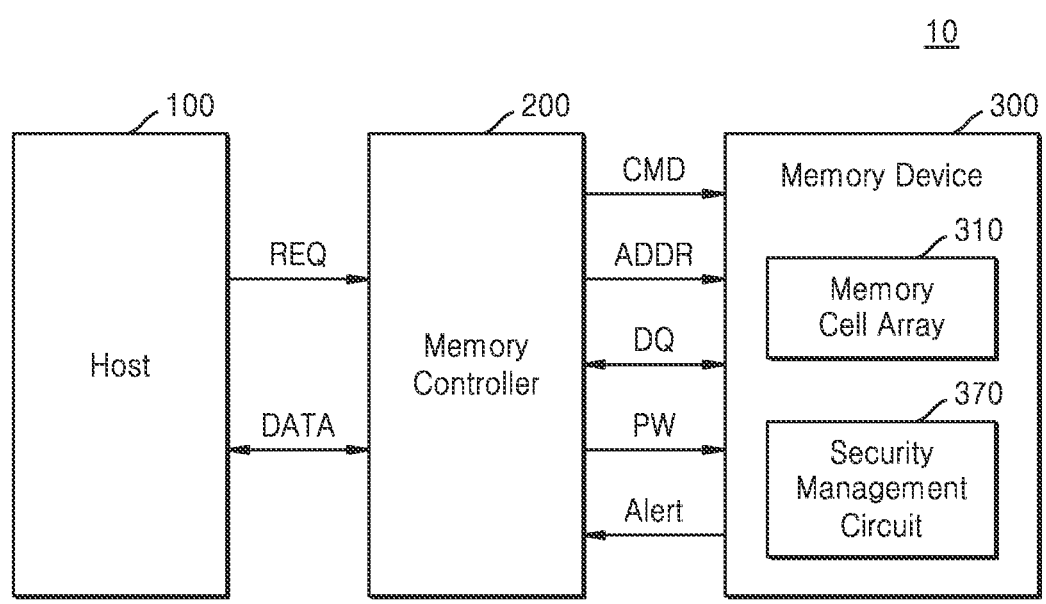
FIG. 1 illustrates a data processing system according to an example embodiment of the inventive concepts.

FIG. 1 illustrates a data processing system 10 according to an example embodiment of the inventive concepts. The data processing system 10 may include a host 100, a memory controller 200, and a memory device 300. The data processing system 10 may be applied to various electronic devices utilizing memory, such as servers, notebooks, smart phones, tablet PCs, printers, scanners, monitors, digital cameras, digital music players, digital media recorders, and/or handheld game consoles, without being limited thereto.

The host 100 may provide data DATA and a request REQ to the memory controller 200. For example, the host 100 may provide the request REQ, such as a read request or a write request for the data DATA, to the memory controller 200. In addition, the host 100 may provide a command, an address, priority information, and the like to the memory controller 200, without being limited thereto. The host 100 may exchange data and signals with the memory controller 200 based on at least one of various interface protocols such as a Universal Serial Bus (USB) protocol, a Multimedia Card (MMC) protocol, a Serial-Advanced Technology Attachment (ATA) protocol, a Parallel-ATA protocol, a Small Computer System Interface (SCSI) protocol, an Enhanced Small Disk Interface (ESDI) protocol, and an Integrated Drive Electronics (IDE) protocol. The host 100 and the memory controller 200, together, may be implemented as a system-on-chip and/or an application processor, which may include a central processing unit (CPU) and/or a graphics processing unit (GPU) and the like.

The memory controller 200 may control the memory device 300 in response to the request REQ of the host 100. For example, the memory controller 200 may control the memory device 300 such that the memory device 300 writes the data DATA in response to a write request received from the host 100 or reads the data DATA in response to a read request received from the host 100. To this end, the memory controller 200 may provide a command CMD and an address ADDR to the memory device 300, and data DQ to be written and read data DQ may be transmitted and received between the memory controller 200 and the memory device 300. In some embodiments, the memory controller 200 may provide a password PW to the memory device 300. The password PW provided by the memory controller 200 to the memory device 300 may be referred to as an input password. In some embodiments, the memory controller 200 may provide the password PW to the memory device 300 via a command line. In some embodiments, the command line may be a signal line through which command CMD is transmitted.

The memory device 300 may include a memory cell array 310 and a security management circuit 370. The memory cell array 310 may include a plurality of memory cells. For example, the memory cell array 310 may include a plurality of memory cells arranged in regions in which a plurality of word lines intersect with a plurality of bit lines. The plurality of memory cells included in the memory cell array 310 may be addressed by the address ADDR, and the address ADDR may include a large number of bits for addressing the plurality of memory cells.

In some embodiments, the memory device 300 may be implemented as a volatile memory device. The volatile memory device may be implemented as random access memory (RAM), dynamic RAM (DRAM), or static RAM (SRAM), without being limited thereto. For example, the memory device 300 may correspond to double data rate synchronous dynamic random access memory (DDR SDRAM), low power double data rate (LPDDR) SDRAM, graphics double data rate (GDDR) SDRAM, Rambus dynamic random access memory (RDRAM), or the like. In some embodiments, the memory device 300 may be implemented as high bandwidth memory (HBM). In some embodiments, the memory device 300 may be implemented as resistive memory such as phase change RAM (PRAM), magnetic RAM (MRAM), and resistive RAM (RRAM).

According to an example embodiment, the memory cell array 310 may include a first memory region and a second memory region. For example, the first memory region may denote a region in which normal data is stored, and the second memory region may denote a region in which security data is stored. In other words, the second memory region may be referred to as a security region. The security data may include at least one of various kinds of data requiring security, such as a user password or a kernel of an operating system.

According to an example embodiment, the memory device 300 may include the security management circuit 370. To protect the security data stored in the memory device 300, the security management circuit 370 may limit external access to the security region of the memory cell array 310, in which the security data is stored.

To this end, the security management circuit 370 may store a guard key. In some embodiments, in a guard key injection phase, the security management circuit 370 may receive a guard key from outside the memory device 300 and store the guard key. In some embodiments, in a guard key update phase, the security management circuit 370 may receive a guard key from outside the memory device 300 and update a previously stored guard key. The guard key injection phase and the guard key update phase will be described in more detail with reference to FIGS. 5 and 6.

When receiving a data operation command for the security region of the memory cell array 310, the security management circuit 370 may limit a data operation for the security region of the memory cell array 310 by comparing the guard key with the password PW received from the memory controller 200. The data operation may include a data write operation and/or a data read operation. In some embodiments, responsive to the password PW being consistent (e.g., matching and/or being correlated with) with the guard key, the security management circuit 370 may control the memory device 300 such that the memory device 300 performs the data operation on the security region of the memory cell array 310. In some embodiments, responsive to the password PW being inconsistent (e.g., not matching and/or not being correlated with) with the guard key, the security management circuit 370 may control the memory device 300 such that the memory device 300 does not perform the data operation on the security region of the memory cell array 310. In addition, in some embodiments, responsive to the password PW being inconsistent with the guard key, the security management circuit 370 may output an alert signal Alert to the memory controller 200. In some embodiments, responsive to receiving the data operation command for the security region of the memory cell array 310 and not receiving the password PW, the security management circuit 370 may control the memory device 300 not to perform the data operation on the security region of the memory cell array 310 and may transmit a password request signal to the memory controller 200. Such a data operation phase will be described in more detail with reference to FIGS. 9 to 13. It will be understood that the password PW and the guard key may be consistent, in some embodiments, if the guard key and the password PW match one another, but the present inventive concepts are not limited thereto. In some embodiments, the password PW may be considered to be consistent with the guard key if there is a correlation between the two elements. For example, the password PW may be consistent with the guard key if the guard key can be derived from the password PW, or vice versa. For example, the password PW may be a hash of the guard key, or the guard key may be a hash of the password PW.

To recognize that the data operation command is a command for the security region of the memory cell array 310, the security management circuit 370 may compare region information with the address ADDR provided by the memory controller 200. The region information may denote information about the security region of the memory cell array 310. In some embodiments, the region information may include a start address, which corresponds to the security region of the memory cell array 310, and the size of the security region. In addition, in some embodiments, the region information may include a start address and an end address, which correspond to the security region of the memory cell array 310. In some embodiments, in a memory region allocation phase, the security management circuit 370 may store the region information. The memory region allocation phase will be described in more detail with reference to FIGS. 7, 8, and 14.

According to an example embodiment, the memory device 300 may include the security management circuit 370 managing the security region of the memory cell array 310, whereby the data processing system 10 does not need to include a separate processor for a security solution. In other words, the memory device 300 includes the security management circuit 370 that is a component for a security solution, whereby the memory device 300 may process security data by itself. Furthermore, according to an example embodiment, since the data processing system 10 does not need to include a separate processor for a security solution, the cost for implementing the data processing system 10 may be reduced.

Figure 2:
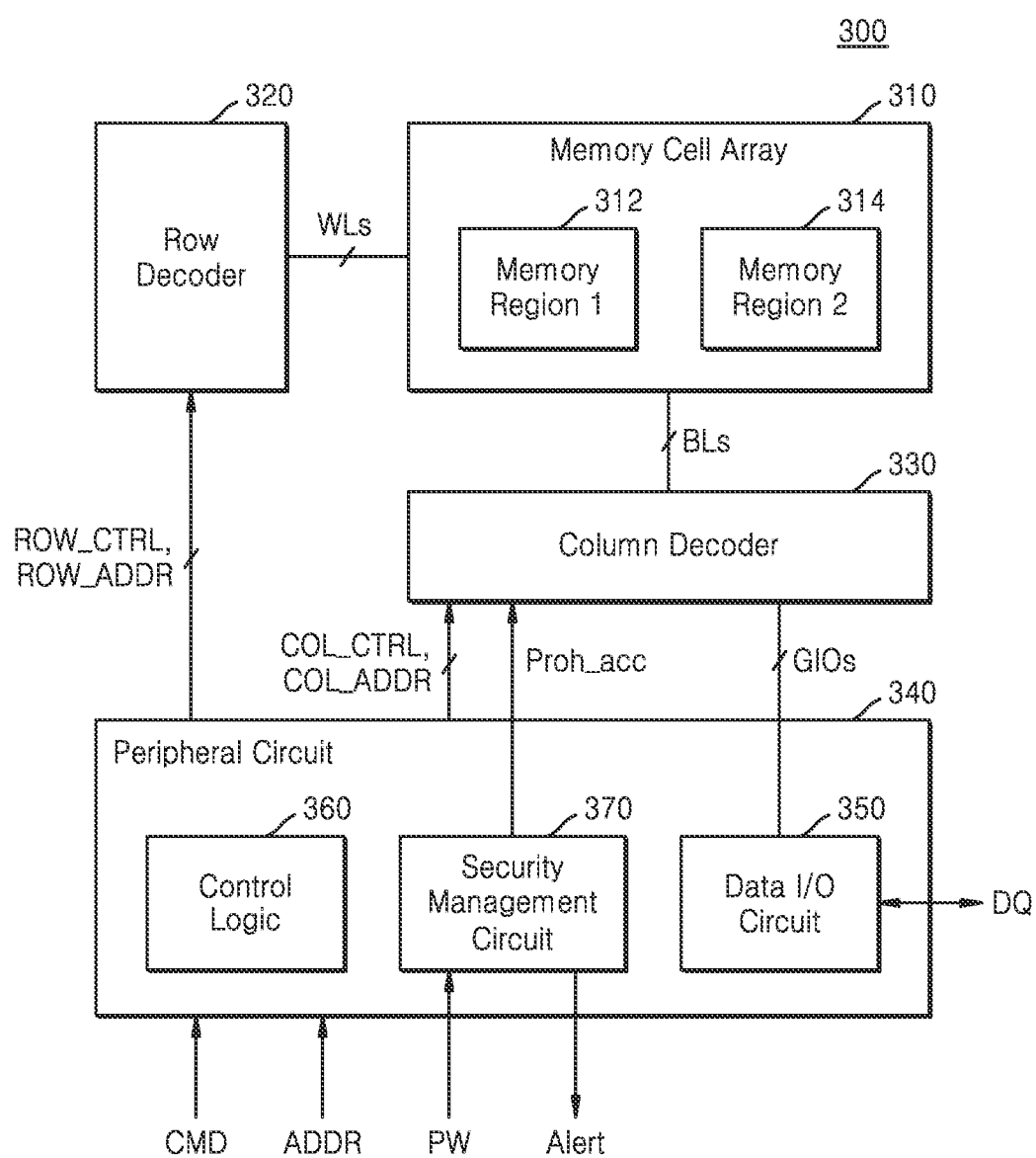
FIG. 2 illustrates a memory device according to an example embodiment of the inventive concepts.

FIG. 2 illustrates the memory device 300 according to an example embodiment of the inventive concepts. The memory device 300 may include the memory cell array 310, a row decoder 320, a column decoder 330, and a peripheral circuit 340, and the peripheral circuit 340 may include a data input/output (I/O) circuit 350, a control logic 360, and the security management circuit 370. For convenience, although FIG. 2 illustrates an example in which the memory device 300 includes one memory cell array 310, the number of memory cell arrays 310 is not limited thereto. In addition, for example, the memory device 300 may include a plurality of memory banks. Regarding the memory device 300 of FIG. 2, repeated descriptions given with reference to FIG. 1 will be omitted. For descriptions regarding FIG. 2, reference will also be made to FIG. 1.

The memory cell array 310 may include a plurality of memory cells arranged in regions in which a plurality of word lines WLs intersect with a plurality of bit lines BLs. In some embodiments, each of the plurality of memory cells may be a DRAM cell including one transistor and one capacitor. The memory cell array 310 may be driven by the row decoder 320 and the column decoder 330. In some embodiments, the memory cell array 310 may include a first memory region 312 and a second memory region 314. The first memory region 312 may denote a region in which normal (e.g., non-secured) data is stored, and the second memory region 314 may denote a region in which security data is stored. The second memory region 314 may be referred to as a security region.

The row decoder 320 may select at least one word line from among the word lines WLs by control by the peripheral circuit 340. The row decoder 320 may receive a row decoder control signal ROW_CTRL and a row address ROW_ADDR from the peripheral circuit 340. The row decoder control signal ROW_CTRL and the row address ROW_ADDR may be generated by the peripheral circuit 340, based on the command CMD and the address ADDR, which are provided by the memory controller 200 external to the memory device 300. For example, when word line addresses intended to be activated and an active command are input to the memory device 300, the peripheral circuit 340 may activate the row decoder control signal ROW_CTRL and generate the row address ROW_ADDR. The row decoder 320 may select the at least one word line based on the row decoder control signal ROW_CTRL and the row address ROW_ADDR. A set of memory cells connected to the selected word line may be considered as one selected page.

The column decoder 330 may select at least one bit line from among the bit lines BLs by control of the peripheral circuit 340. The at least one bit line selected by the column decoder 330 may be connected to global I/O lines GIOs. The column decoder 330 may receive a column decoder control signal COL_CTRL and a column address COL_ADDR from the peripheral circuit 340. For example, after the active command, to store data in a selected page or read data from the selected page, a write command or a read command may be input to the memory device 300. Here, the peripheral circuit 340 may activate the column decoder control signal COL_CTRL and generate the column address COL_ADDR. In some embodiments, the column decoder 330 may be controlled by the security management circuit 370. For example, responsive to the password PW input from outside the memory device 300 being inconsistent with a guard key, or responsive to the password PW having not been input even though the command CMD for the second memory region 314 has been input, the security management circuit 370 may provide an access prohibition signal Proh_acc to the column decoder 330, whereby a data operation for the second memory region 314 may not be performed. In some embodiments, responsive to the password PW input from outside the memory device 300 being inconsistent with the guard key, or responsive to the password PW having not been input even though the command CMD for the second memory region 314 has been input, the security management circuit 370 may control the peripheral circuit 340 such that the peripheral circuit 340 does not activate the column decoder control signal COL_CTRL.

Although FIG. 2 illustrates an embodiment in which the security management circuit 370 provides the access prohibition signal Proh_acc to the column decoder 330, the inventive concepts are not limited thereto. For example, the security management circuit 370 may not allow the memory device 300 to perform a data operation on the second memory region 314 by providing the access prohibition signal Proh_acc to the row decoder 320. In some embodiments, the security management circuit 370 may provide the access prohibition signal Proh_acc to the row decoder 320 and the column decoder 330.

The peripheral circuit 340 may receive the command CMD and the address ADDR as inputs from the memory controller 200 external to the memory device 300. The peripheral circuit 340 may generate the row decoder control signal ROW_CTRL, the row address ROW_ADDR, the column decoder control signal COL_CTRL, and the column address COL_ADDR, based on the command CMD and the address ADDR. The peripheral circuit 340 may provide the row decoder control signal ROW_CTRL and the row address ROW_ADDR to the row decoder 320 and provide the column decoder control signal COL_CTRL and the column address COL_ADDR to the column decoder 330. The peripheral circuit 340 may transmit the data DQ to and/or receive the data DQ from the outside of the memory device 300. For example, the peripheral circuit 340 may transmit and/or receive the data DQ via a data I/O pad.

The data I/O circuit 350 may transmit the data DQ to and/or receive the data DQ from the outside of the memory device 300 via the global I/O lines GIOs. The data I/O circuit 350 may have a configuration including an I/O gating circuit and a data I/O buffer.

The control logic 360 may control an overall operation of the memory device 300. In some embodiments, the control logic 360 may include a command decoder and may decode signals related to the command CMD, for example, a chip select signal (/CS), a row address strobe signal (/RAS), a column address strobe signal (/CAS), a write enable signal (/WE), a clock enable signal (CKE), and the like, to internally generate decoded command signals.

To protect security data stored in the memory device 300, the security management circuit 370 may limit external access to the second memory region 314 of the memory cell array 310, in which the security data stored.

To this end, the security management circuit 370 may store a guard key. In some embodiments, in a guard key injection phase, the security management circuit 370 may receive the guard key from outside the memory device 300 and store the guard key. In some embodiments, in a guard key update phase, the security management circuit 370 may receive a guard key from outside the memory device 300 and update a previously stored guard key. The guard key injection phase and the guard key update phase will be described in more detail with reference to FIGS. 5 and 6.

When receiving a data operation command for the second memory region (security region) 314, the security management circuit 370 may limit a data operation for the second memory region 314 by comparing the guard key with the password PW received from the memory controller 200. In some embodiments, responsive to the password PW being consistent with the guard key, the security management circuit 370 may control the memory device 300 such that the memory device 300 performs the data operation on the second memory region 314. In some embodiments, responsive to the password PW being inconsistent with the guard key, the security management circuit 370 may control the memory device 300 such that the memory device 300 does not perform the data operation on the second memory region 314. For example, the security management circuit 370 may provide the access prohibition signal Proh_acc to the column decoder 330. In addition, in some embodiments, responsive to the password PW being inconsistent with the guard key, the security management circuit 370 may output the alert signal Alert to the memory controller 200. In some embodiments, responsive to receiving the data operation command for the second memory region 314 and not receiving the password PW, the security management circuit 370 may control the memory device 300 to not perform the data operation on the second memory region 314 and may transmit a password request signal to the memory controller 200. Such a data operation phase will be described in more detail with reference to FIGS. 9 to 13.

To recognize that the data operation command is a command for the second memory region 314, the security management circuit 370 may compare region information with the address ADDR provided by the memory controller 200. The region information may denote information about the second memory region 314. In some embodiments, the region information may include a start address, which corresponds to the second memory region 314, and the size of the security region. In addition, in some embodiments, the region information may include a start address and an end address, which correspond to the second memory region 314. In some embodiments, in a memory region allocation phase, the security management circuit 370 may store the region information. The memory region allocation phase will be described in more detail with reference to FIGS. 7, 8, and 14.

The security management circuit 370 may be implemented in various forms in the memory device 300 and may be implemented in the form of hardware or software depending upon embodiments. For example, when the security management circuit 370 is implemented in the form of hardware, the security management circuit 370 may include circuits for performing a security region management operation. In addition, for example, when the security management circuit 370 is implemented in the form of software, a program (or instructions) and/or random I/O code, which are stored in the memory device 300, may be executed by the control logic 360 or at least one processor in the memory device 300, thereby performing a calculation operation. However, the inventive concepts are not limited to the embodiments set forth above, and the security management circuit 370 may be implemented in the form of a combination of software and hardware, such as firmware.

According to an example embodiment, the memory device 300 may include the security management circuit 370 managing the second memory region 314, whereby the data processing system 10 does not need to include a separate processor for a security solution. In other words, the memory device 300 may include the security management circuit 370 that is a component for a security solution, whereby the memory device 300 may process security data by itself. Furthermore, according to an example embodiment, since the data processing system 10 does not need to include a separate processor for a security solution, the cost for implementing the data processing system 10 may be reduced.

Figure 3:
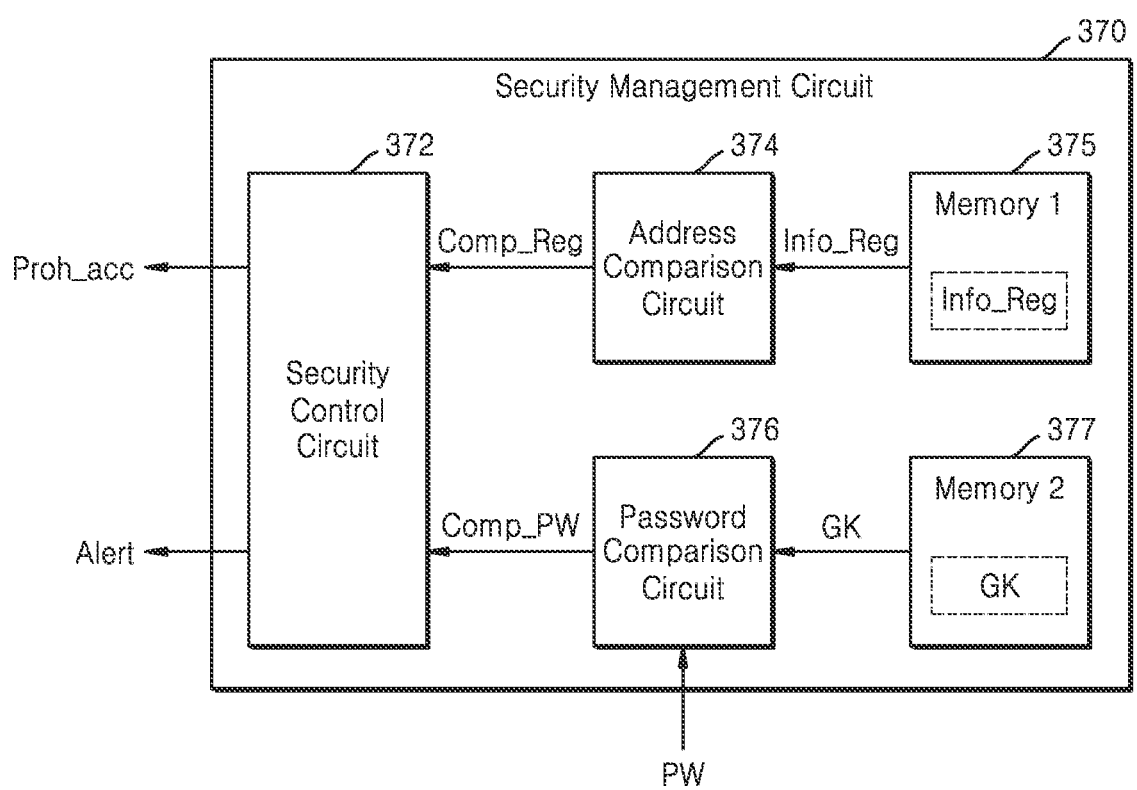
FIG. 3 illustrates a security management circuit according to an example embodiment of the inventive concepts.

FIG. 3 illustrates the security management circuit 370 according to an example embodiment of the inventive concepts. The security management circuit 370 may include a security control circuit 372, an address comparison circuit 374, a first memory 375, a password comparison circuit 376, and a second memory 377. Regarding the security management circuit 370 of FIG. 3, repeated descriptions given with reference to FIGS. 1 and 2 will be omitted. For descriptions regarding FIG. 3, reference will also be made to FIGS. 1 and 2.

The first memory 375 may store region information Info_Reg. In some embodiments, in a memory region allocation phase, the first memory 375 may store or update the region information Info_Reg. In some embodiments, in a data operation phase, the first memory 375 may provide the region information Info_Reg to the address comparison circuit 374. The first memory 375 may include at least one of various types of volatile memory and various types of non-volatile memory.

The address comparison circuit 374 may determine whether a received command is a command for the second memory region 314 of the memory cell array 310 by comparing the region information Info_Reg with the address ADDR provided by the memory controller 200. In some embodiments, the address comparison circuit 374 may generate a region comparison result Comp_Reg by comparing the region information Info_Reg with the address ADDR. The region comparison result Comp_Reg may indicate whether the received command is a command for the second memory region 314 of the memory cell array 310 or a command for the first memory region 312 of the memory cell array 310. For example, when the received command is a command for the second memory region 314 of the memory cell array 310, the region comparison result Comp_Reg may indicate a first logic level (for example, '1'), and when the received command is a command for the first memory region 312 of the memory cell array 310, the region comparison result Comp_Reg may indicate a second logic level (for example, '0'). The address comparison circuit 374 may provide the region comparison result Comp_Reg to the security control circuit 372.

The second memory 377 may store a guard key GK. In some embodiments, in a guard key injection phase or a guard key update phase, the second memory 377 may store or update the guard key GK. In some embodiments, in a data operation phase, the second memory 377 may provide the guard key GK to the password comparison circuit 376. The second memory 377 may include at least one of various types of volatile memory and various types of non-volatile memory. The first memory 375 and the second memory 377 may respectively include separate hardware memories from each other, without being limited thereto. For example, the first memory 375 and the second memory 377 may respectively refer to memories corresponding to different regions in one hardware memory.

In addition, although FIG. 3 illustrates an embodiment in which the first memory 375 and the second memory 377 are included in the security management circuit 370, the inventive concepts are not limited thereto. For example, the first memory 375 and/or the second memory 377 may be included in or correspond to arbitrary memory in the memory device 300.

The password comparison circuit 376 may generate a password comparison result Comp_PW by comparing the guard key GK with the password PW provided by the memory controller 200. For example, when the password PW is consistent with the guard key GK, the password comparison result Comp_PW may indicate a first logic level (for example, '1'), and when the password PW is inconsistent with the guard key GK, the password comparison result Comp_PW may indicate a second logic level (for example, '0'). Here, the first logic level and the second logic level are used for the convenience of description and may refer to levels independent of the first logic level and the second logic level, which are included in the descriptions of the address comparison circuit 374. The password comparison circuit 376 may provide the password comparison result Comp_PW to the security control circuit 372.

The security control circuit 372 may control a data operation of the memory device 300, based on the region comparison result Comp_Reg, which is provided by the address comparison circuit 374, and the password comparison result Comp_PW, which is provided by the password comparison circuit 376. In some embodiments, responsive to the password PW input from the memory controller 200 being inconsistent with the guard key GK, the security control circuit 372 may output the alert signal Alert to the outside of the memory device 300 and may provide the access prohibition signal Proh_acc to the column decoder 330. In addition, in some embodiments, responsive to a received command being a command for the second memory region 314 and the password PW not being input from the memory controller 200, the security control circuit 372 may provide the access prohibition signal Proh_acc to the column decoder 330.

Each of the security control circuit 372, the address comparison circuit 374, and the password comparison circuit 376 may be implemented in various forms in the memory device 300 and may be implemented in the form of hardware or software depending upon embodiments. However, the inventive concepts are not limited to the embodiments set forth above, and each of the security control circuit 372, the address comparison circuit 374, and the password comparison circuit 376 may be implemented in the form of a combination of software and hardware, such as firmware.

FIGS. 4A to 4D each illustrate the memory cell array 310 according to an example embodiment of the inventive concepts. For descriptions regarding FIGS. 4A to 4D, reference will also be made to FIG. 3.

Figure 4A:
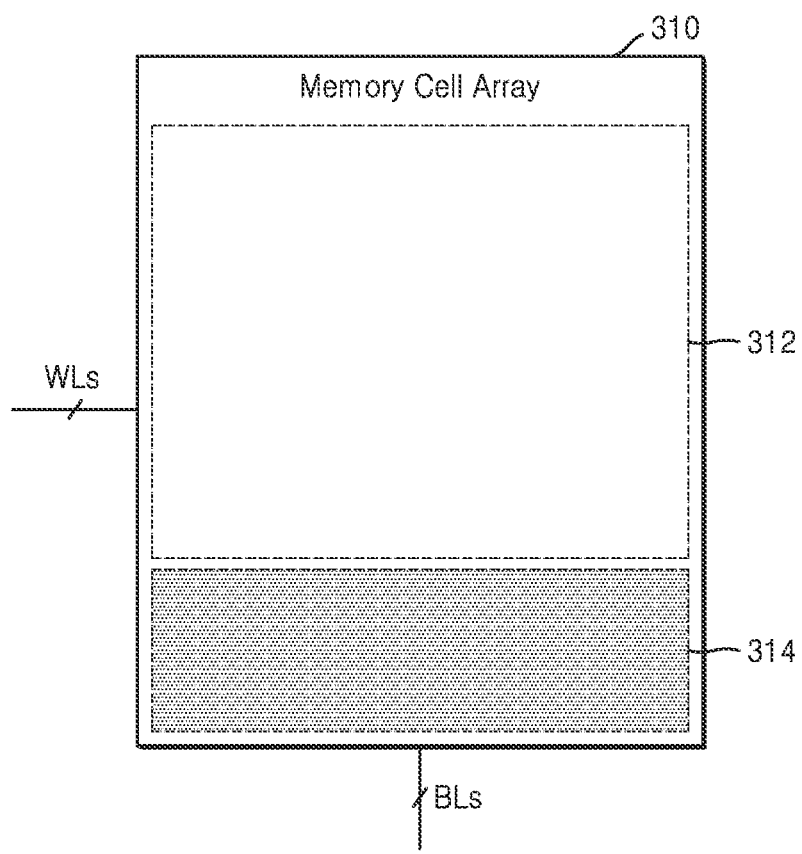
FIGS. 4A to 4D each illustrate a memory cell array according to an example embodiment of the inventive concepts.

Referring to FIG. 4A, the memory cell array 310 may include the first memory region 312 and the second memory region 314. The first memory region 312 and the second memory region 314 may be classified and/or differentiated from each other based on a word line connected thereto. In other words, the first memory region 312 and the second memory region 314 may be classified and/or differentiated from each other based on a row address. Here, the region information Info_Reg may include a start row address of the second memory region 314 and the size of the second memory region 314. In some embodiments, the region information Info_Reg may include a start row address and an end row address of the second memory region 314.

Figure 4B:
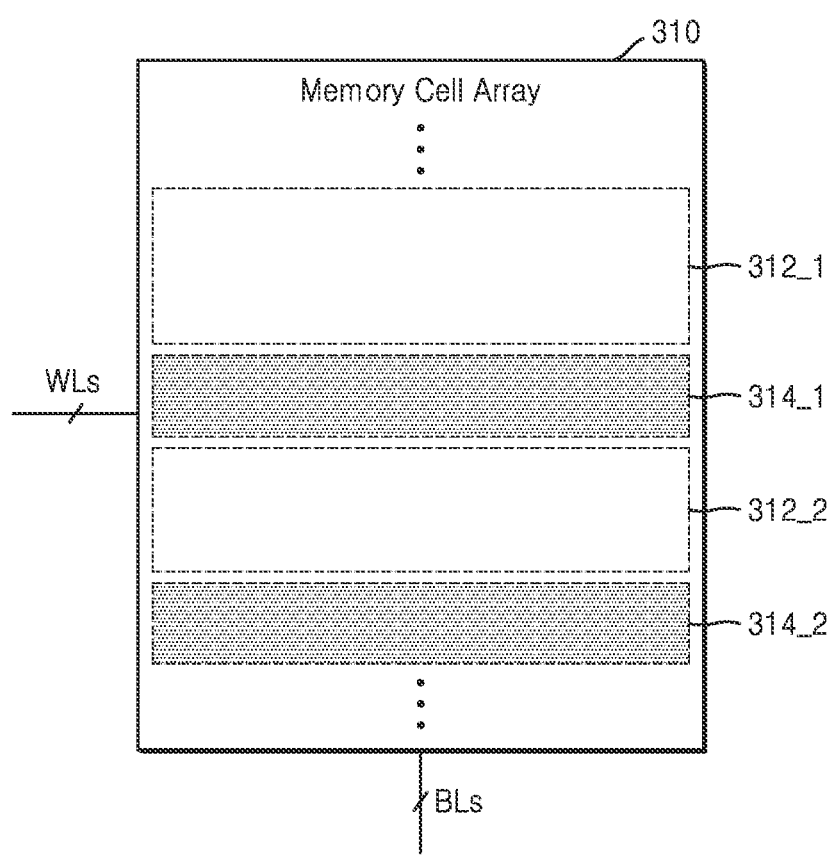

Referring to FIG. 4B, the memory cell array 310 may include a plurality of first memory regions 312_1 and 312_2 and a plurality of second memory regions 314_1 and 314_2. The plurality of first memory regions 312_1 and 312_2 and the plurality of second memory regions 314_1 and 314_2 may be classified and/or differentiated from each other based on a word line connected thereto. In other words, the plurality of first memory regions 312_1 and 312_2 and the plurality of second memory regions 314_1 and 314_2 may be classified and/or differentiated from each other based on a row address. Here, the region information Info_Reg may include the size and a start row address of each of the plurality of second memory regions 314_1 and 314_2. In some embodiments, the region information Info_Reg may include a start row address and an end row address of each of the plurality of second memory regions 314_1 and 314_2.

Figure 4C:
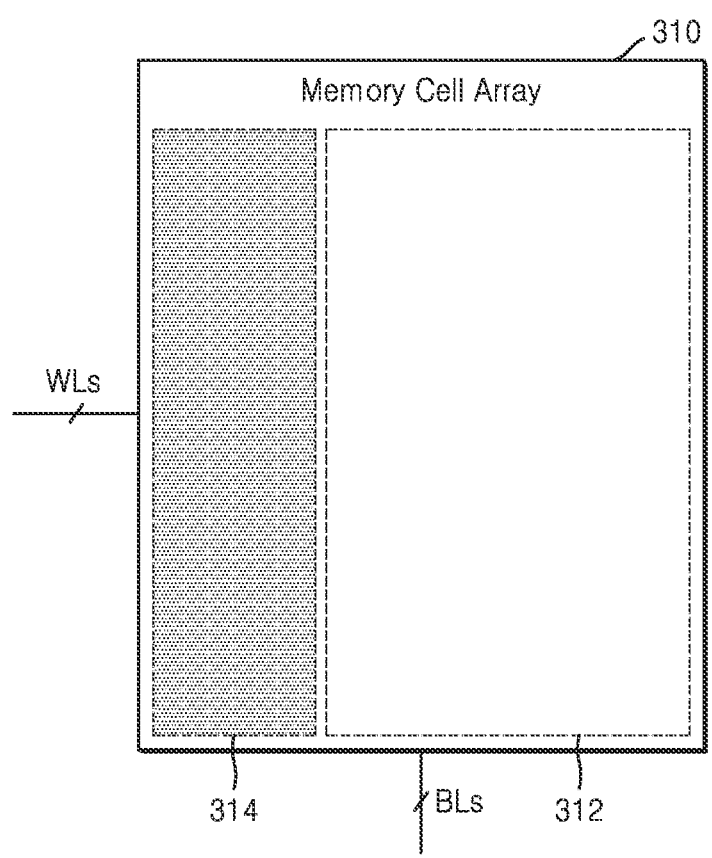

Referring to FIG. 4C, the memory cell array 310 may include the first memory region 312 and the second memory region 314. The first memory region 312 and the second memory region 314 may be classified and/or differentiated from each other based on a bit line connected thereto. In other words, the first memory region 312 and the second memory region 314 may be classified and/or differentiated from each other based on a column address. Here, the region information Info_Reg may include a start column address of the second memory region 314 and the size of the second memory region 314. In some embodiments, the region information Info_Reg may include a start column address and an end column address of the second memory region 314.

Figure 4D:
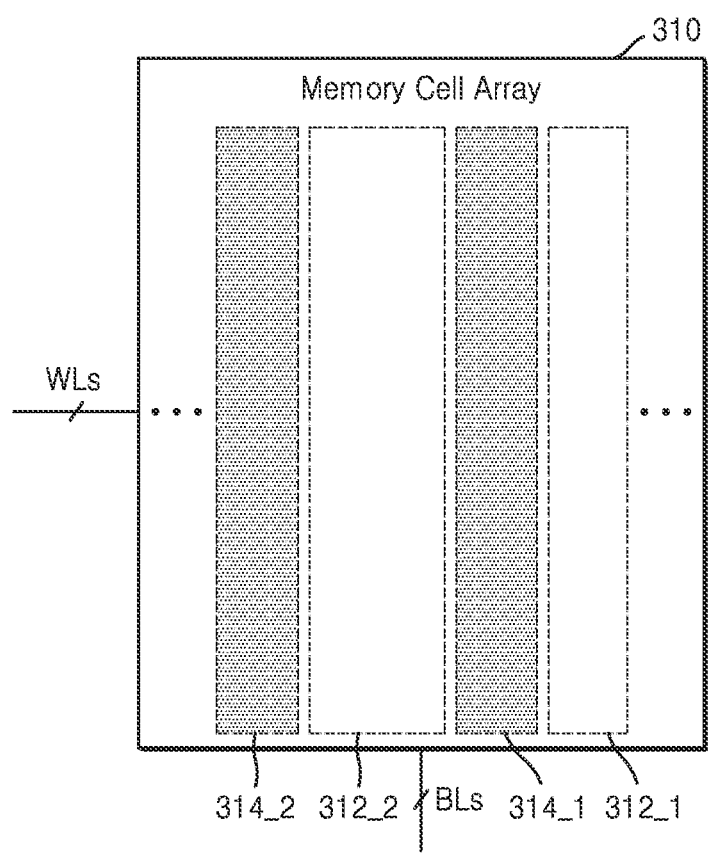

Referring to FIG. 4D, the memory cell array 310 may include the plurality of first memory regions 312_1 and 312_2 and the plurality of second memory regions 314_1 and 314_2. The plurality of first memory regions 312_1 and 312_2 and the plurality of second memory regions 314_1 and 314_2 may be classified and/or differentiated from each other based on a bit line connected thereto. In other words, the plurality of first memory regions 312_1 and 312_2 and the plurality of second memory regions 314_1 and 314_2 may be classified and/or differentiated from each other based on a column address. Here, the region information Info_Reg may include the size and a start column address of each of the plurality of second memory regions 314_1 and 314_2. In some embodiments, the region information Info_Reg may include a start column address and an end column address of each of the plurality of second memory regions 314_1 and 314_2.

Figure 4E:
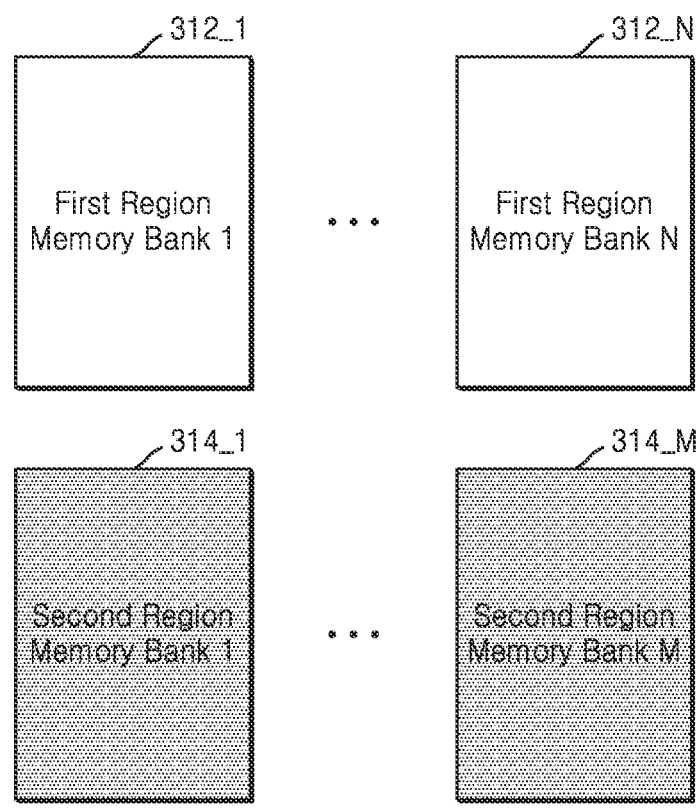
FIG. 4E illustrates a plurality of memory banks according to an example embodiment of the inventive concepts.

FIG. 4E illustrates a plurality of memory banks according to an example embodiment of the inventive concepts. For descriptions regarding FIG. 4E, reference will also be made to FIGS. 2 and 3.

The memory device 300 may include a plurality of memory banks. The plurality of memory banks may include a plurality of first region memory banks 312_1, . . . , and 312_N and a plurality of second region memory banks 314_1, . . . , and 314_M (where each of N and M is a natural number). The plurality of first region memory banks 312_1, . . . , and 312_N may store normal (e.g., non-secured) data, and the plurality of second region memory banks 314_1, . . . , and 314_M may store security data. Here, the region information Info_Reg may include information about the plurality of second region memory banks 314_1, . . . , and 314_M.

Figure 5:
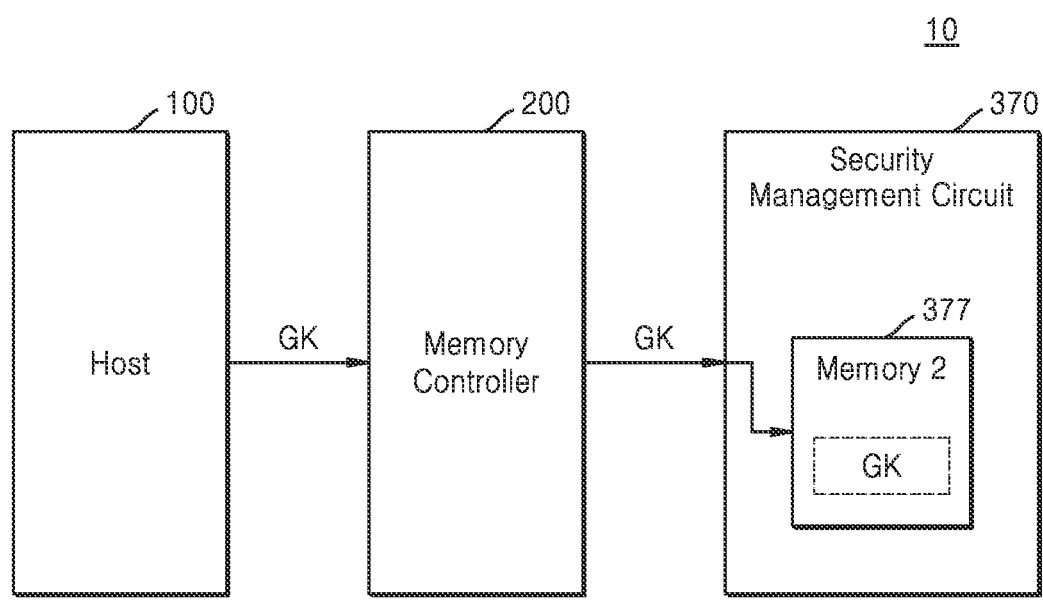
FIG. 5 illustrates a data processing system in a guard key injection phase or a guard key update phase, according to an example embodiment of the inventive concepts.

FIG. 5 illustrates the data processing system 10 in a guard key injection phase or a guard key update phase, according to an example embodiment of the inventive concepts. Regarding the data processing system 10, repeated descriptions given with reference to FIG. 1 will be omitted. For descriptions regarding FIG. 5, reference will also be made to FIG. 1.

In the guard key injection phase or the guard key update phase, the host 100 may generate the guard key GK. The host 100 may generate the guard key GK by itself or by receiving an input from a user of the host 100. In some embodiments, the host 100 may generate a new guard key GK at regular intervals. For example, the host 100 may improve the security of the data processing system 10 by generating the new guard key GK at regular intervals. The host 100 may provide the generated guard key GK to the memory controller 200.

The memory controller 200 may provide the guard key GK to the security management circuit 370. In some embodiments, before providing the guard key GK to the security management circuit 370, the memory controller 200 may provide, to the memory device 300, a mode signal notifying the guard key injection phase or the guard key update phase. For example, the memory controller 200 may provide the mode signal to the memory device 300 via a command line.

The security management circuit 370 may store or update the guard key GK received from the memory controller 200. For example, the second memory 377 may store the received guard key GK or may update an existing guard key based on the received guard key GK.

Figure 6:
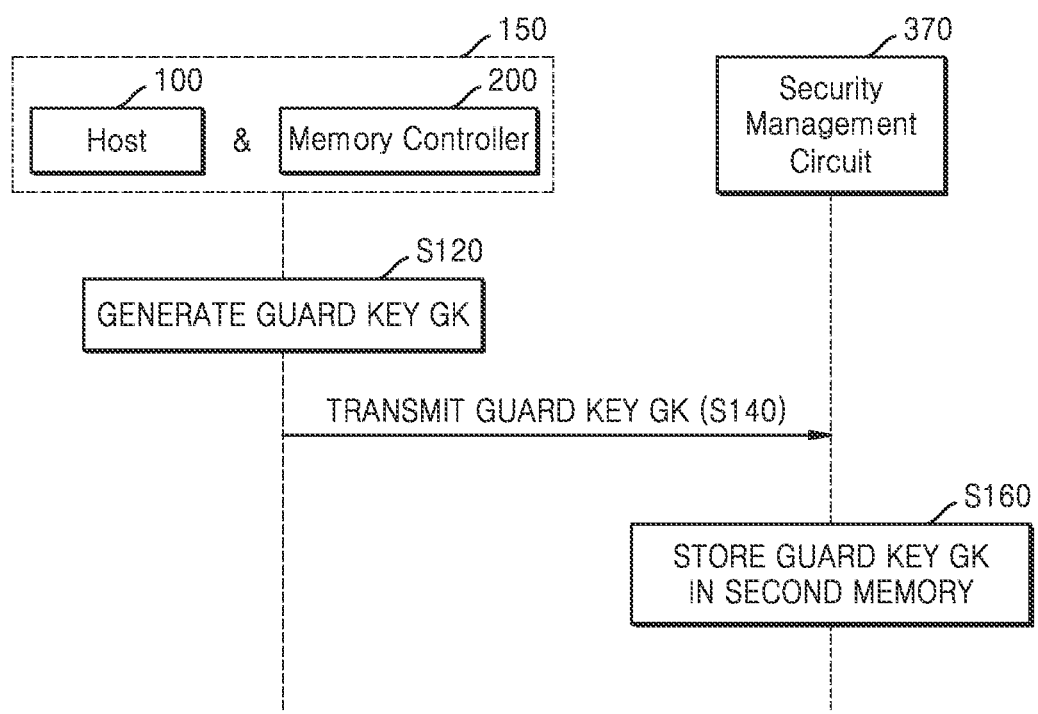
FIG. 6 illustrates a flowchart of a guard key injection phase or a guard key update phase, according to an example embodiment of the inventive concepts.

FIG. 6 illustrates a flowchart of a guard key injection phase or a guard key update phase, according to an example embodiment of the inventive concepts. For convenience, the host 100 and the memory controller 200 will be collectively referred to as a host system 150. For descriptions regarding FIG. 6, reference will also be made to FIG. 5.

The host system 150 may generate the guard key GK (S120).

The host system 150 may transmit the generated guard key GK to the security management circuit 370 (S140).

The security management circuit 370 may store the received guard key GK in the second memory 377 (S160). For example, in the guard key injection phase, the security management circuit 370 may newly store the received guard key GK in the second memory 377. As such, storing the guard key GK in the second memory 377 for the first time will be referred to as guard key injection. For example, in the guard key update phase, the security management circuit 370 may update the guard key GK by substituting an existing guard key stored in the second memory 377 with the received guard key GK. In some embodiments, the security management circuit 370 may store a value derived from the guard key GK (e.g., a hash of the guard key GK) rather than the guard key GK itself.

Figure 7:
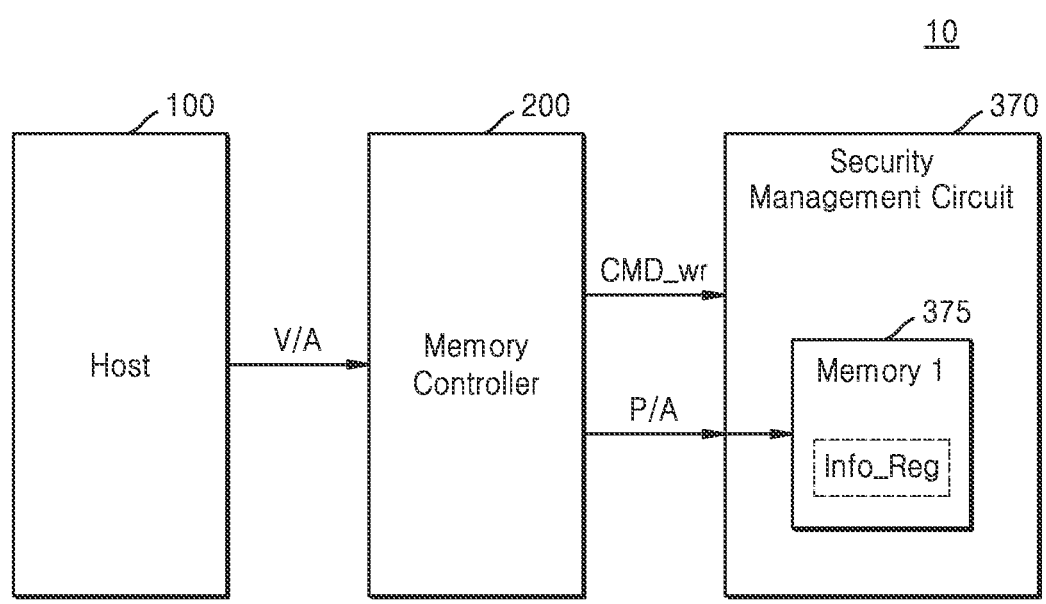
FIG. 7 illustrates a data processing system in a memory region allocation phase, according to an example embodiment of the inventive concepts.

FIG. 7 illustrates the data processing system 10 in a memory region allocation phase, according to an example embodiment of the inventive concepts. Regarding the data processing system 10, repeated descriptions given with reference to FIG. 1 will be omitted. For descriptions regarding FIG. 7, reference will also be made to FIG. 1.

In the memory region allocation phase, the host 100 may allocate a virtual memory region. The virtual memory region may correspond to the second memory region (or security region) of the memory cell array 310 of the memory device 300. The host 100 may provide, to the memory controller 200, a virtual address V/A corresponding to the allocated virtual memory region. In some embodiments, the virtual address V/A may include a starting virtual address and an ending virtual address of the allocated virtual memory region. In some embodiments, the virtual address V/A may include a starting virtual address and a size of the allocated virtual memory region.

The memory controller 200 may map the virtual address V/A to a physical address P/A. To this end, the memory controller 200 may store a mapping table including physical addresses respectively corresponding to a plurality of virtual addresses.

As described with reference to the previous figures, the security management circuit 370 may store the region information Info_Reg and may control the memory device 300, based on the region information Info_Reg. To allow the memory device 300 to generate and store the region information Info_Reg corresponding to the virtual memory region, the memory controller 200 may transmit a write command CMD wr to the memory device 300. In some embodiments, to notify the memory device 300 of the memory region allocation phase, the memory controller 200 may transmit a mode signal to the memory device 300 via a command line, before transmitting the write command CMD wr or at the same time as transmitting the write command CMD wr. After transmitting the write command CMD wr or at the same time as transmitting the write command CMD wr, the memory controller 200 may provide the physical address P/A mapped based on the virtual address V/A to the memory device 300 via an address line.

The security management circuit 370 may generate the region information Info_Reg based on the physical address P/A received from the memory controller 200 and may store the generated region information Info_Reg in the first memory 375. The region information Info_Reg may denote information about the security region of the memory cell array 310.

Figure 8:
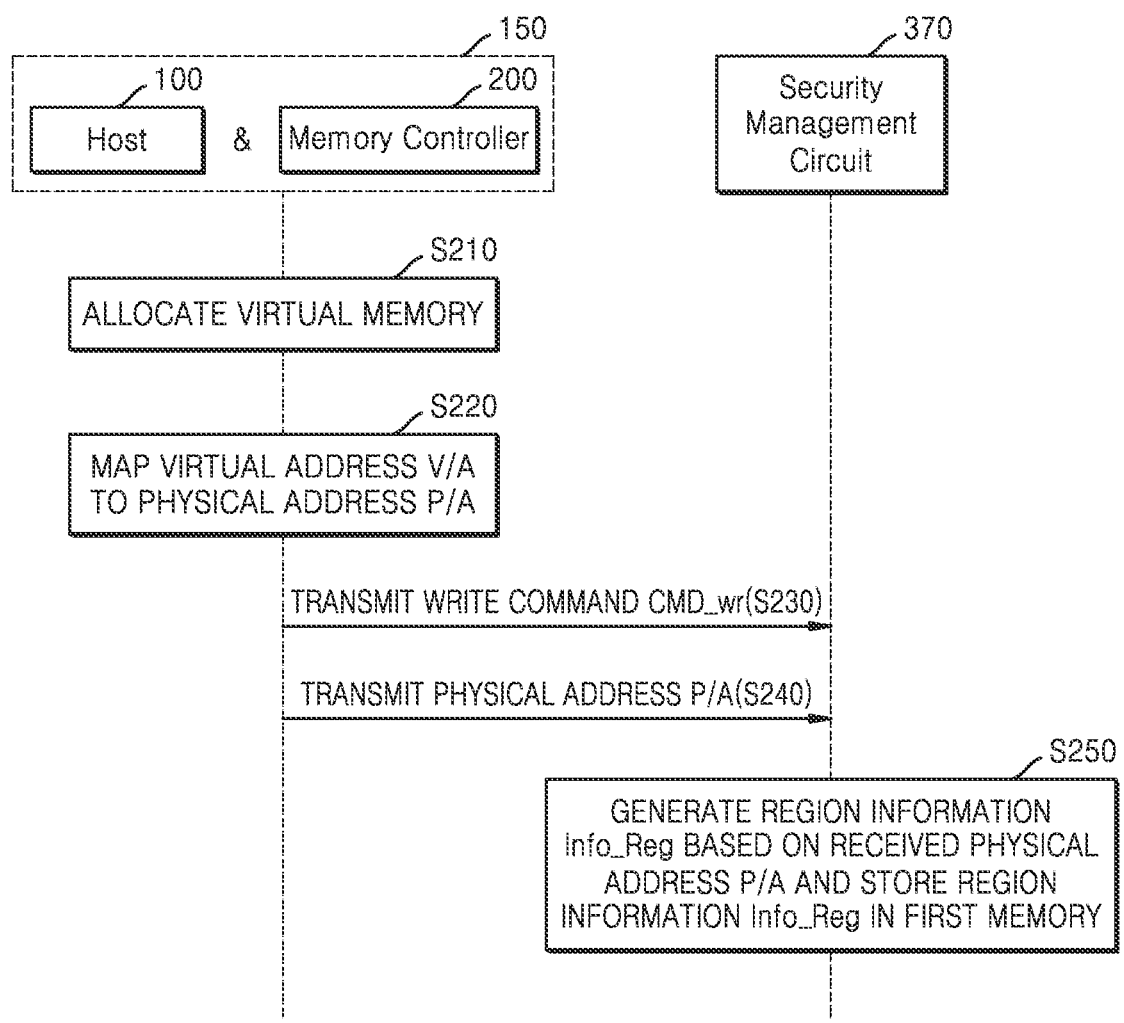
FIG. 8 illustrates a flowchart of a memory region allocation phase, according to an example embodiment of the inventive concepts.

FIG. 8 illustrates a flowchart of a memory region allocation phase, according to an example embodiment of the inventive concepts. For convenience, the host 100 and the memory controller 200 will be collectively referred to as the host system 150. For descriptions regarding FIG. 8, reference will also be made to FIG. 7.

The host system 150 may allocate a virtual memory region (S210).

The host system 150 may map the virtual address V/A corresponding to the virtual memory region to the physical address P/A (S220). For example, the host system 150 may obtain the the physical address P/A corresponding to the virtual memory region by mapping the virtual address V/A to the physical address P/A based on a mapping table stored in the memory controller 200.

The host system 150 may transmit the write command CMD wr to the memory device 300 (S230).

The host system 150 may transmit the mapped physical address P/A to the memory device 300 (S240). For example, the host system 150 may transmit the physical address P/A to the security management circuit 370.

The security management circuit 370 may generate the region information Info_Reg based on the received physical address P/A and may store the generated region information Info_Reg in the first memory 375 (S250).

Through the memory region allocation phase according to an example embodiment, which is shown in FIG. 8, both the host system 150 and the memory device 300 of the data processing system 10 may recognize a common memory region as the second memory region (security region) 314 of the memory cell array 310.

Figure 9:
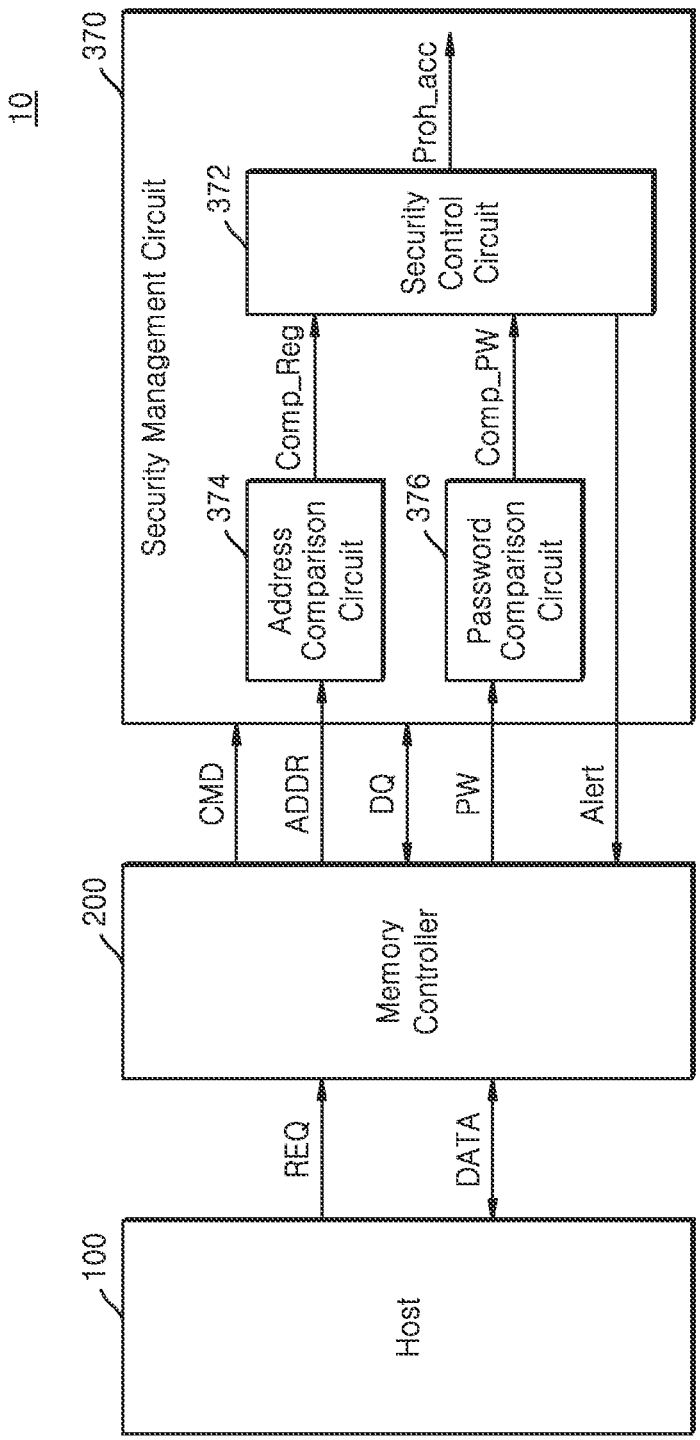
FIG. 9 illustrates a data processing system in a data operation phase, according to an example embodiment.

FIG. 9 illustrates the data processing system 10 in a data operation phase, according to an example embodiment of the inventive concepts. Regarding the data processing system 10, repeated descriptions given with reference to FIG. 1 will be omitted. For descriptions regarding FIG. 9, reference will also be made to FIGS. 1 and 2.

The host 100 may transmit the request REQ to the memory controller 200. For example, the host 100 may transmit, to the memory controller 200, a data operation request such as a data read request or a data write request.

The memory controller 200 may transmit the command CMD, the address ADDR, and the data DQ to the memory device 300, based on the request REQ of the host 100. When transmitting a data read command for the second memory region (security region) 314 of the memory cell array 310, the memory controller 200 may provide the password PW to the memory device 300. The memory controller 200 may provide the password PW to the memory device 300 under the control of the host 100. In some embodiments, the host 100 may receive the password PW from another component of a computing system. However, the inventive concepts are not limited thereto, and in some embodiments, the host 100 may receive the password PW from a user of the host 100. For example, the memory controller 200 may provide the password PW to the security management circuit 370.

The address comparison circuit 374 may generate the region comparison result Comp_Reg by comparing the stored region information Info_Reg with the address ADDR provided by the memory controller 200. The address comparison circuit 374 may provide the region comparison result Comp_Reg to the security control circuit 372.

The password comparison circuit 376 may generate the password comparison result Comp_PW by comparing a stored guard key with the password PW provided by the memory controller 200. The password comparison circuit 376 may provide the password comparison result Comp_PW to the security control circuit 372.

The security control circuit 372 may perform a control operation based on the region comparison result Comp_Reg and the password comparison result Comp_PW. For example, responsive to the password PW being inconsistent with the guard key, the security control circuit 372 may provide the alert signal Alert to the memory controller 200 and may control the memory device 300 such that the memory device 300 does not perform a data operation on the second memory region 314. For example, the security control circuit 372 may provide the access prohibition signal Proh_acc to the column decoder 330. In addition, for example, responsive to receiving a data operation command for the second memory region 314 despite no input of the password PW, the security control circuit 372 may provide a password request signal to the memory controller 200 and may control the memory device 300 such that the memory device 300 does not perform a data operation on the second memory region 314. For example, the security control circuit 372 may provide the access prohibition signal Proh_acc to the column decoder 330.

The data operation phase of the data processing system 10 will be described by assuming various cases with reference to FIGS. 10 to 13.

Figure 10:
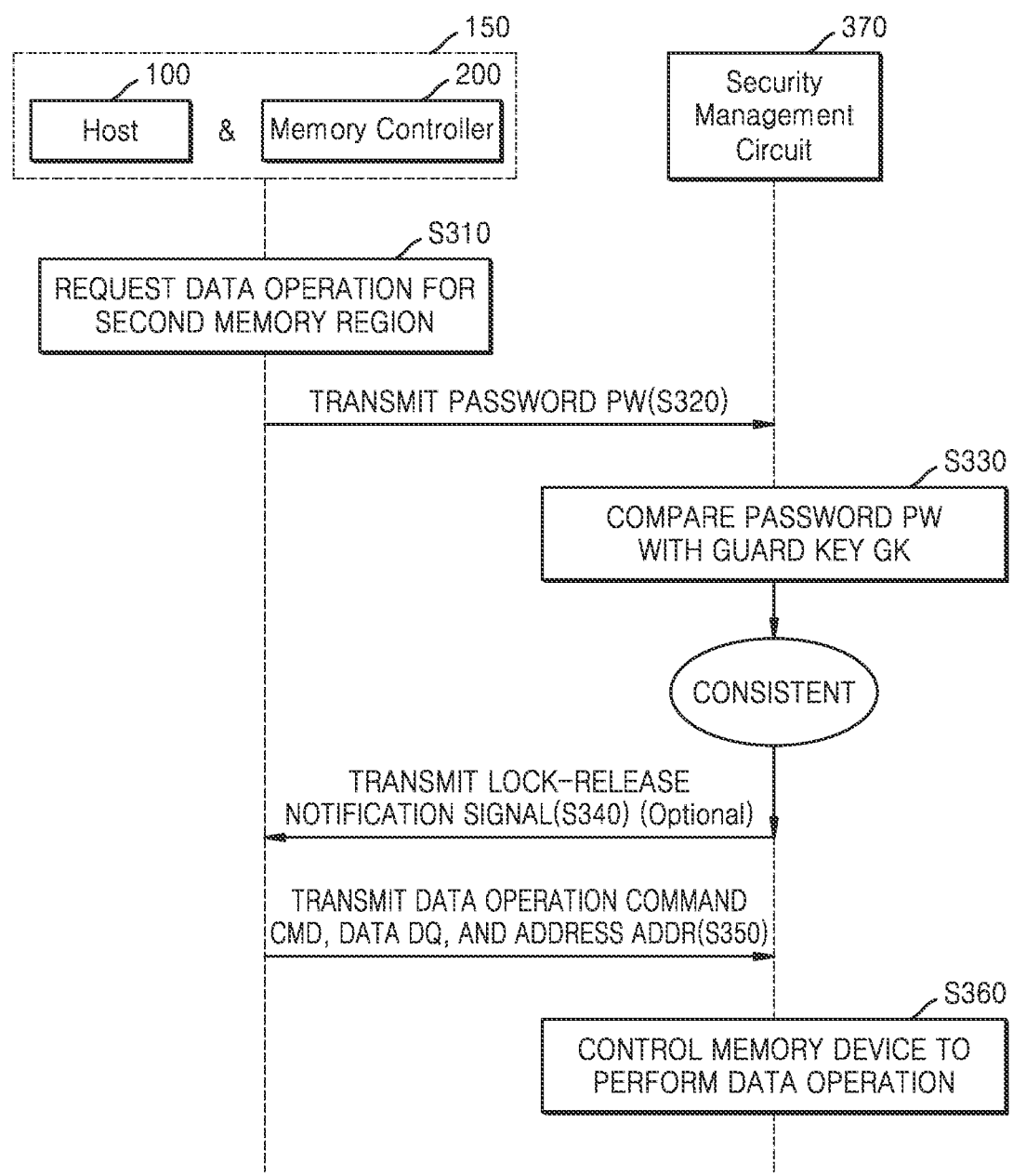
FIG. 10 illustrates a flowchart of a data operation phase, according to an example embodiment of the inventive concepts.

FIG. 10 illustrates a flowchart of a data operation phase, according to an example embodiment of the inventive concepts. In particular, FIG. 10 illustrates a flowchart of the case where a password is transmitted first before transmitting a command signal and the password is consistent with a guard key. For convenience, the host 100 and the memory controller 200 will be collectively referred to as the host system 150. For descriptions regarding FIG. 10, reference will also be made to FIGS. 2, 3, and 9.

The host 100 may generate a data operation request for the second memory region 314 of the memory cell array 310 in the memory device 300 (S310). The host 100 may provide the data operation request to the memory controller 200.

The host system 150 may transmit the password PW to the security management circuit 370 (S320). In some embodiments, the memory controller 200 may transmit the password PW to the memory device 300 via a command line.

The security management circuit 370 may compare the stored guard key GK with the password PW received from the memory controller 200 (S330). In some embodiments, the password comparison circuit 376 in the security management circuit 370 may compare the guard key GK with the password PW. The guard key GK may be stored in the second memory 377 in the security management circuit 370, and may have been stored in the second memory 377 through the guard key injection phase or the guard key update phase, which has been described with reference to FIGS. 5 and 6. In some embodiments, the security management circuit 370 may compare the guard key GK with the password PW by using a hash function.

The following processes will be described by assuming the case where the password PW is consistent with the guard key GK. The case where the password PW is inconsistent with the guard key GK will be described with reference to FIG. 12.

The security management circuit 370 may transmit a lock release notification signal to the host system 150 (S340). The lock release notification signal may be a signal indicating that a data operation for the second memory region 314 is able to be performed since locking of the second memory region 314 is released. The process of S340 is optional and may be omitted.

The host system 150 may transmit the command CMD for a data operation, the data DQ, and the address ADDR to the memory device 300 (S350).

The security management circuit 370 may control the memory device 300 such that the memory device 300 performs the data operation based on the command CMD, the data DQ, and the address ADDR (S360).

As such, responsive to the password PW being consistent with the guard key GK, the memory device 300 may perform the data operation on the second memory region 314 that is a security region.

Figure 11:
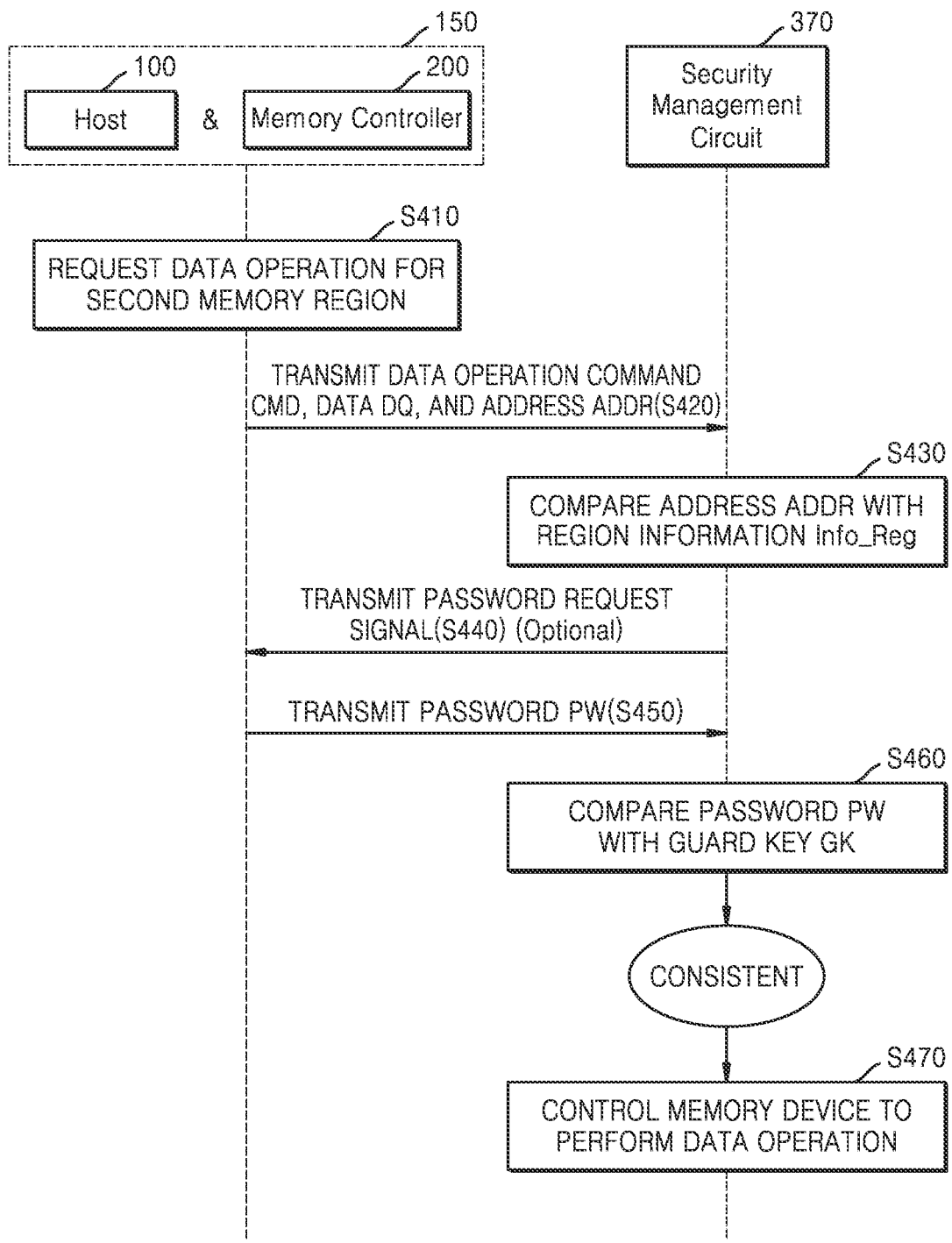
FIG. 11 illustrates a flowchart of a data operation phase, according to an example embodiment of the inventive concepts.

FIG. 11 illustrates a flowchart of a data operation phase, according to an example embodiment of the inventive concepts. In particular, FIG. 11 illustrates a flowchart of the case where a command signal is transmitted first before transmitting a password and the password is consistent with a guard key. For convenience, the host 100 and the memory controller 200 will be collectively referred to as the host system 150. For descriptions regarding FIG. 11, reference will also be made to FIGS. 2, 3, and 9.

The host 100 may generate a data operation request for the second memory region 314 of the memory cell array 310 in the memory device 300 (S410). The host 100 may provide the data operation request to the memory controller 200.

The host system 150 may transmit the command CMD for a data operation, the data DQ, and the address ADDR to the memory device 300 (S420).

The security management circuit 370 may compare the received address ADDR with the region information Info_Reg (S430). In some embodiments, the address comparison circuit 374 in the security management circuit 370 may compare the address ADDR with the region information Info_Reg. The region information Info_Reg may be stored in the first memory 375 in the security management circuit 370, and may have been stored in the first memory 375 through the memory region allocation phase described with reference to FIGS. 7, 8, and 14.

The following processes will be described by assuming the case where the command CMD is a command for the second memory region 314, which is a security region, as a result of the comparison between the address ADDR and the region information Info_Reg.

The security management circuit 370 may control the memory device 300 such that the memory device 300 permits or withholds a data operation.

The security management circuit 370 may transmit a password request signal to the host system 150 (S440). The password request signal may denote a signal requesting the memory device 300 to transmit a password. The process of S440 is optional and may be omitted.

The host system 150 may transmit the password PW to the security management circuit 370 (S450). In some embodiments, the memory controller 200 may transmit the password PW to the memory device 300 via a command line.

The security management circuit 370 may compare the stored guard key GK with the password PW received from the memory controller 200 (S460). In some embodiments, the password comparison circuit 376 in the security management circuit 370 may compare the guard key GK with the password PW. The guard key GK may be stored in the second memory 377 in the security management circuit 370 and may have been stored in the second memory 377 through the guard key injection phase or the guard key update phase, which has been described with reference to FIGS. 5 and 6. In some embodiments, the security management circuit 370 may compare the guard key GK with the password PW by using a hash function.

The following processes will be described by assuming the case where the password PW is consistent with the guard key GK. The case where the password PW is inconsistent with the guard key GK will be described with reference to FIG. 13.

The security management circuit 370 may control the memory device 300 such that the memory device 300 performs the data operation based on the command CMD, the data DQ, and the address ADDR (S470).

As such, responsive to the password PW being consistent with the guard key GK, the memory device 300 may perform the data operation on the second memory region 314 that is a security region.

Figure 12:
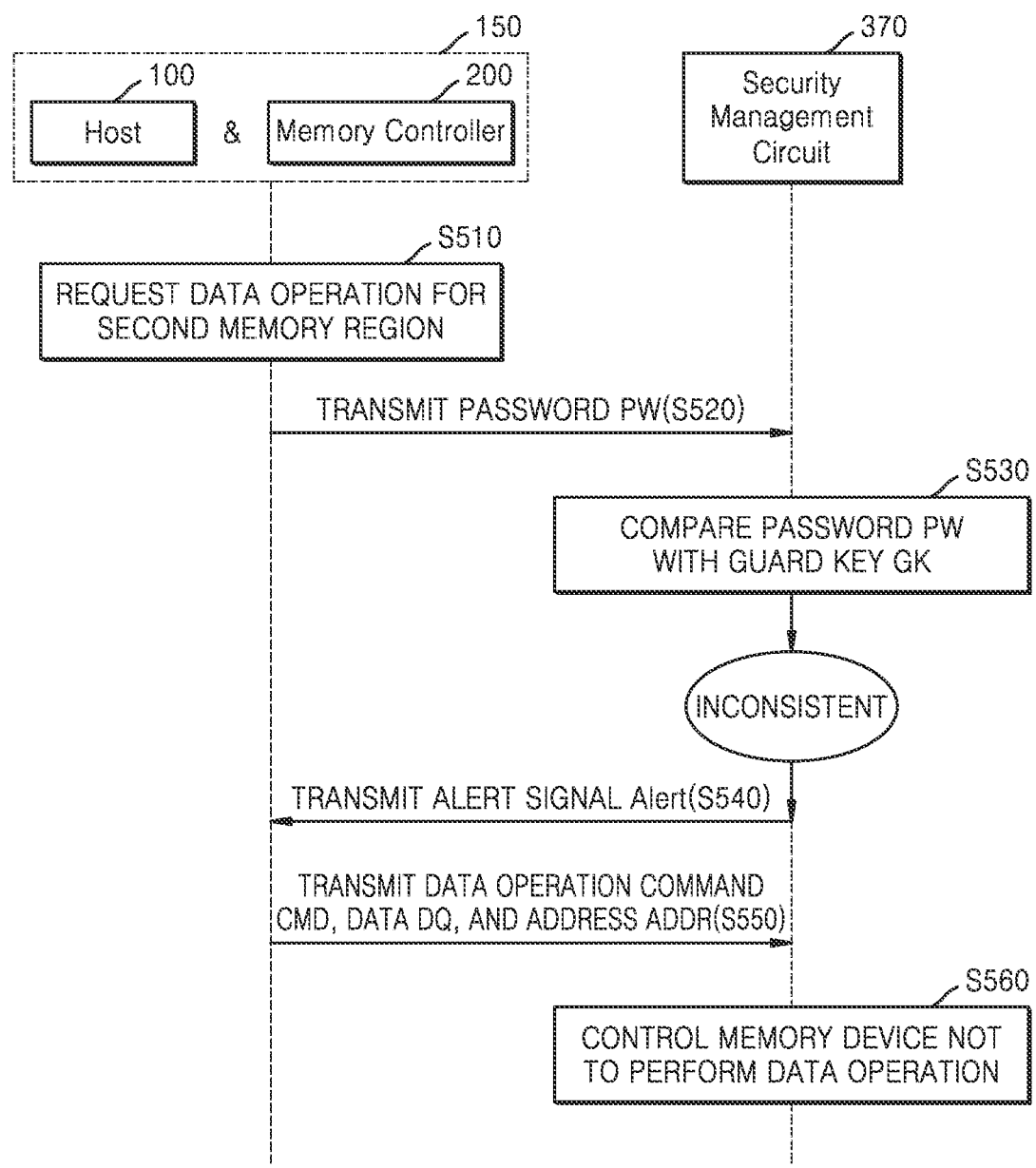
FIG. 12 illustrates a flowchart of a data operation phase, according to an example embodiment of the inventive concepts.

FIG. 12 illustrates a flowchart of a data operation phase, according to an example embodiment of the inventive concepts. In particular, FIG. 12 illustrates a flowchart of the case where a password is transmitted first before transmitting a command signal and the password is inconsistent with a guard key. For convenience, the host 100 and the memory controller 200 will be collectively referred to as the host system 150. For descriptions regarding FIG. 12, reference will also be made to FIGS. 2, 3, and 9.

The host 100 may generate a data operation request for the second memory region 314 of the memory cell array 310 in the memory device 300 (S510). The host 100 may provide the data operation request to the memory controller 200.

The host system 150 may transmit the password PW to the security management circuit 370 (S520). In some embodiments, the memory controller 200 may transmit the password PW to the memory device 300 via a command line.

The security management circuit 370 may compare the stored guard key GK with the password PW received from the memory controller 200 (S530). In some embodiments, the password comparison circuit 376 in the security management circuit 370 may compare the guard key GK with the password PW. The guard key GK may be stored in the second memory 377 in the security management circuit 370, and may have been stored in the second memory 377 through the guard key injection phase or the guard key update phase, which has been described with reference to FIGS. 5 and 6. In some embodiments, the security management circuit 370 may compare the guard key GK with the password PW by using a hash function.

The following processes will be described by assuming the case where the password PW is inconsistent with the guard key GK. The case where the password PW is consistent with the guard key GK has been described with reference to FIG. 10.

The security management circuit 370 may transmit the alert signal Alert to the host system 150 (S540). The alert signal Alert may be a signal indicating that a data operation for the second memory region 314 is not able and/or not allowed to be performed.

The host system 150 may transmit the command CMD for a data operation, the data DQ, and the address ADDR to the memory device 300 (S550).

Even though the command CMD, the data DQ, and the address ADDR have been received by the memory device 300, the security management circuit 370 may control the memory device 300 such that the memory device 300 does not perform the data operation (S560). For example, the security management circuit 370 may control the row decoder 320 and/or the column decoder 330 such that data is not written to or not read from the second memory region 314 of the memory cell array 310.

As such, responsive to the password PW being inconsistent with the guard key GK, the memory device 300 may not perform the data operation on the second memory region 314 that is a security region. Thus, the memory device 300 may block (or limit) unauthorized external access to the second memory region 314. Therefore, the second memory region 314 may be protected, and security data stored in the second memory region 314 may be protected.

Figure 13:
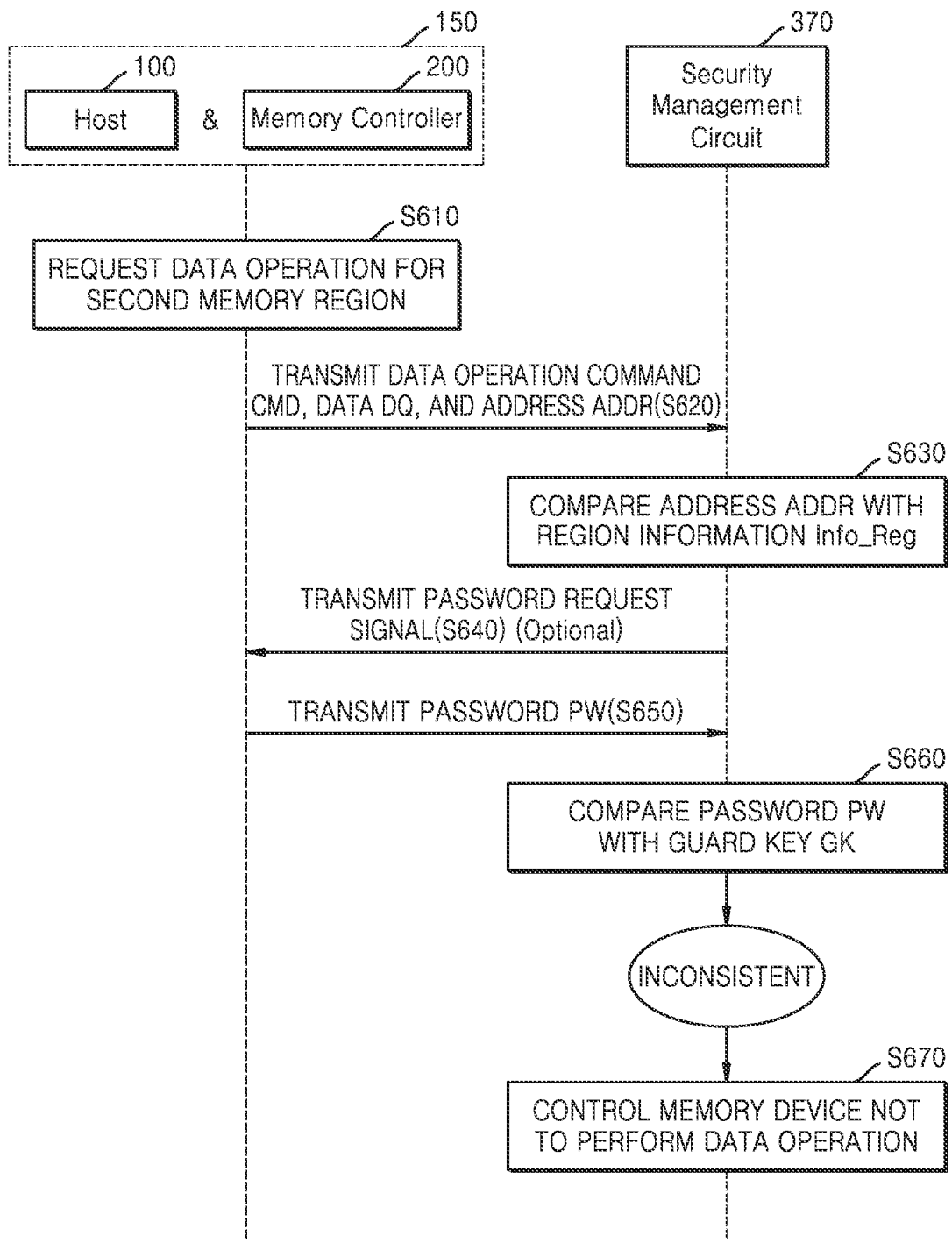
FIG. 13 illustrates a flowchart of a data operation phase, according to an example embodiment of the inventive concepts.

FIG. 13 illustrates a flowchart of a data operation phase, according to an example embodiment of the inventive concepts. In particular, FIG. 13 illustrates a flowchart of the case where a command signal is transmitted first before transmitting a password and the password is inconsistent with a guard key. For convenience, the host 100 and the memory controller 200 will be collectively referred to as the host system 150. For descriptions regarding FIG. 13, reference will also be made to FIGS. 2, 3, and 9.

The host 100 may generate a data operation request for the second memory region 314 of the memory cell array 310 in the memory device 300 (S610). The host 100 may provide the data operation request to the memory controller 200.

The host system 150 may transmit the command CMD for a data operation, the data DQ, and the address ADDR to the memory device 300 (S620).

The security management circuit 370 may compare the received address ADDR with the region information Info_Reg (S630). In some embodiments, the address comparison circuit 374 in the security management circuit 370 may compare the address ADDR with the region information Info_Reg. The region information Info_Reg may be stored in the first memory 375 in the security management circuit 370, and may have been stored in the first memory 375 through the memory region allocation phase described with reference to FIGS. 7, 8, and 14.

The following processes will be described by assuming the case where the command CMD is a command for the second memory region 314, which is a security region, as a result of the comparison between the address ADDR and the region information Info_Reg.

The security management circuit 370 may transmit a password request signal to the host system 150 (S640). The password request signal may denote a signal requesting the memory device 300 to transmit a password. The process of S640 is optional and may be omitted.

The host system 150 may transmit the password PW to the security management circuit 370 (S650). In some embodiments, the memory controller 200 may transmit the password PW to the memory device 300 via a command line.

The security management circuit 370 may compare the stored guard key GK with the password PW received from the memory controller 200 (S660). In some embodiments, the password comparison circuit 376 in the security management circuit 370 may compare the guard key GK with the password PW. The guard key GK may be stored in the second memory 377 in the security management circuit 370, and may have been stored in the second memory 377 through the guard key injection phase or the guard key update phase, which has been described with reference to FIGS. 5 and 6. In some embodiments, the security management circuit 370 may compare the guard key GK with the password PW by using a hash function.

The following processes will be described by assuming the case where the password PW is inconsistent with the guard key GK. The case where the password PW is consistent with the guard key GK has been described with reference to FIG. 11.

Even though the command CMD, the data DQ, and the address ADDR have been received by the memory device 300, the security management circuit 370 may control the memory device 300 such that the memory device 300 does not perform the data operation (S670). For example, the security management circuit 370 may control the row decoder 320 and/or the column decoder 330 such that data is not written to or not read from the second memory region 314 of the memory cell array 310.

As such, responsive to the password PW being inconsistent with the guard key GK, the memory device 300 may not perform the data operation on the second memory region 314 that is a security region. Thus, the memory device 300 may block (or limit) unauthorized external access to the second memory region 314. Therefore, the second memory region 314 may be protected, and security data stored in the second memory region 314 may be protected.

Figure 14:
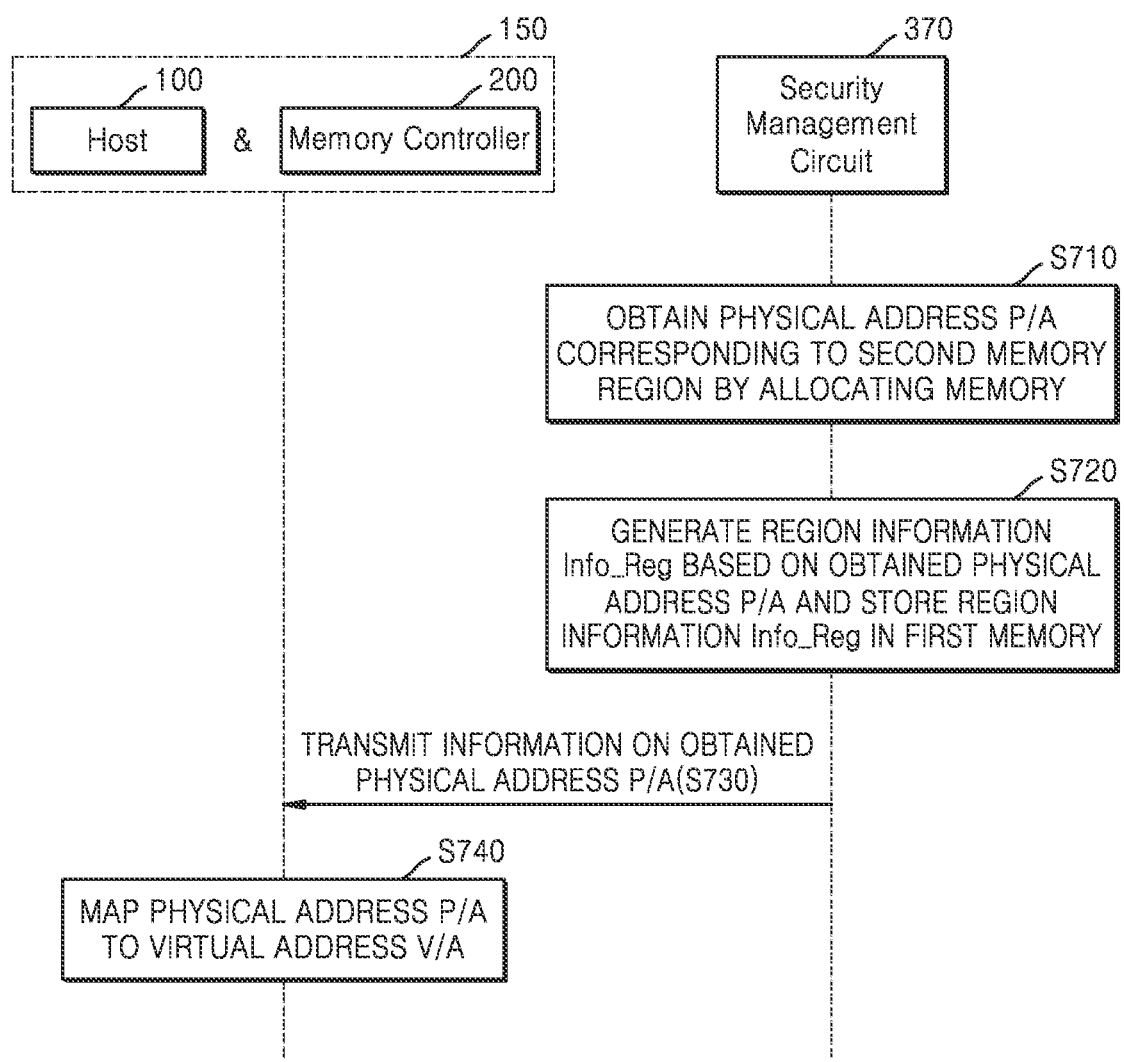
FIG. 14 illustrates a flowchart of a memory region allocation phase, according to an example embodiment of the inventive concepts.

FIG. 14 illustrates a flowchart of a memory region allocation phase, according to an example embodiment of the inventive concepts. For convenience, the host 100 and the memory controller 200 will be collectively referred to as the host system 150. For descriptions regarding FIG. 14, reference will also be made to FIGS. 3 and 7.

The security management circuit 370 may allocate a memory region that is to be used as the second memory region (security region) 314 in the memory cell array 310, thereby obtaining the physical address P/A corresponding to the second memory region 314 (S710).

The security management circuit 370 may generate the region information Info_Reg based on the obtained physical address P/A and may store the generated region information Info_Reg in the first memory 375 (S720).

The security management circuit 370 may transmit information about the obtained physical address P/A to the host system 150 (S730).

The host system 150 may map the received physical address P/A to the virtual address V/A (S740). For example, the host system 150 may obtain the the virtual address V/A corresponding to the second memory region 314 by mapping the physical address P/A to the virtual address V/A based on a mapping table stored in the memory controller 200.

Through the memory region allocation phase according to an example embodiment, which is shown in FIG. 14, both the host system 150 and the memory device 300 of the data processing system 10 may recognize a common memory region as the second memory region (security region) 314 of the memory cell array 310.

Figure 15:
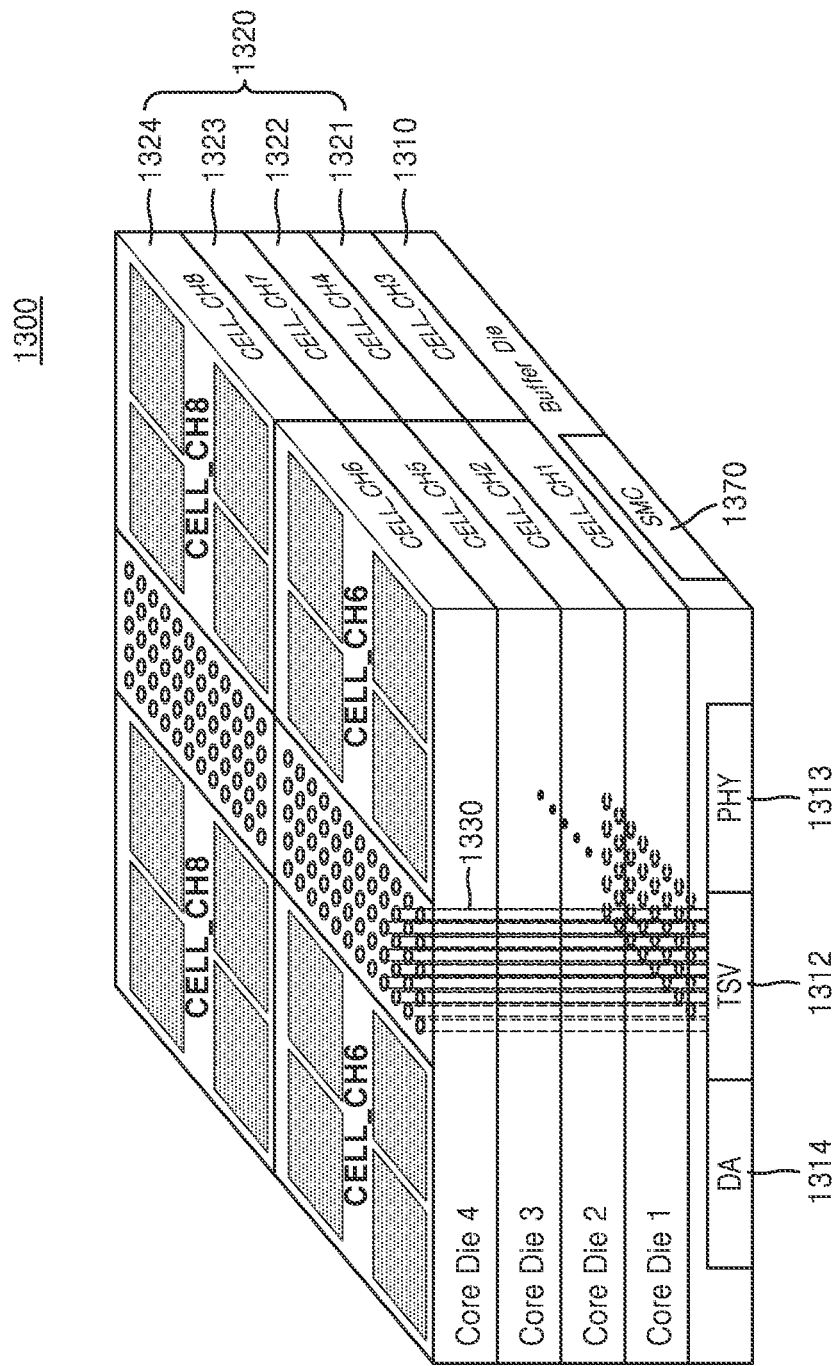
FIG. 15 illustrates a structure of a memory device, according to an example embodiment of the inventive concepts.

FIG. 15 illustrates a structure of a memory device 1300, according to an example embodiment of the inventive concepts. FIG. 15 illustrates the memory device 1300 of a high bandwidth memory (HBM) type, which includes a large number of channels having interfaces independent of each other and thus has an increased bandwidth.

The memory device 1300 may include a large number of layers. As an example, the memory device 1300 may include a buffer die 1310 and at least one core die 1320 stacked on the buffer die 1310. For example, a first core die 1321 may include a first channel CH1 and a third channel CH3, a second core die 1322 may include a second channel CH2 and a fourth channel CH4, a third core die 1323 may include a fifth channel CH5 and a seventh channel CH7, and a fourth core die 1324 may include a sixth channel CH6 and an eighth channel CH8.

The buffer die 1310 may communicate with a memory controller (e.g., memory controller 200), receive a command, an address, and data from the memory controller, and provide the command, the address, and the data, which are received, to the at least one core die 1320. The buffer die 1310 may communicate with the memory controller via a conductive means such as a bump formed on an outer surface thereof. The buffer die 1310 may buffer the command, the address, and the data, and thus, the memory controller may interface with the at least one core die 1320 by driving only a load of the buffer die 1310.

In addition, the memory device 1300 may include a large number of through-silicon vias (TSVs) 1330, which penetrate the layers. The TSVs 1330 may be arranged in correspondence with the channels CH1 to CH8, and when each of the channels CH1 to CH8 has a bandwidth of 128 bits, the TSVs 1330 may include components for 1024-bit data I/O.

The buffer die 1310 may include a TSV region 1312, a physical (PHY) region 1313, and a direct access (DA) region 1314. The TSV region 1312 is a region in which the TSVs 1330 for communication with the at least one core die 1320 are formed. In addition, the PHY region 1313 is a region including a large number of I/O circuits for communication with the memory controller external to the memory device 1300, and various signals from the memory controller may be provided to the TSV region 1312 via the PHY region 1313 and may be provided to the at least one core die 1320 via the TSVs 1330.

According to an example embodiment, a security management circuit 1370 may be implemented in the buffer die 1310. The security management circuit 1370 may have a configuration corresponding to the security management circuit 370 described with reference to FIGS. 1 to 14.

In a test mode for the memory device 1300, the DA region 1314 may directly communicate with a tester external to the memory device 1300 via a conductive means arranged on an outer surface of the memory device 1300. Various signals provided by the tester may be provided to the at least one core die 1320 via the DA region 1314 and the TSV region 1312. In some embodiments, in an embodiment that may be obtained by modification, various signals provided by the tester may be provided to the at least one core die 1320 via the DA region 1314, the PHY region 1313, and the TSV region 1312.

Figure 16:
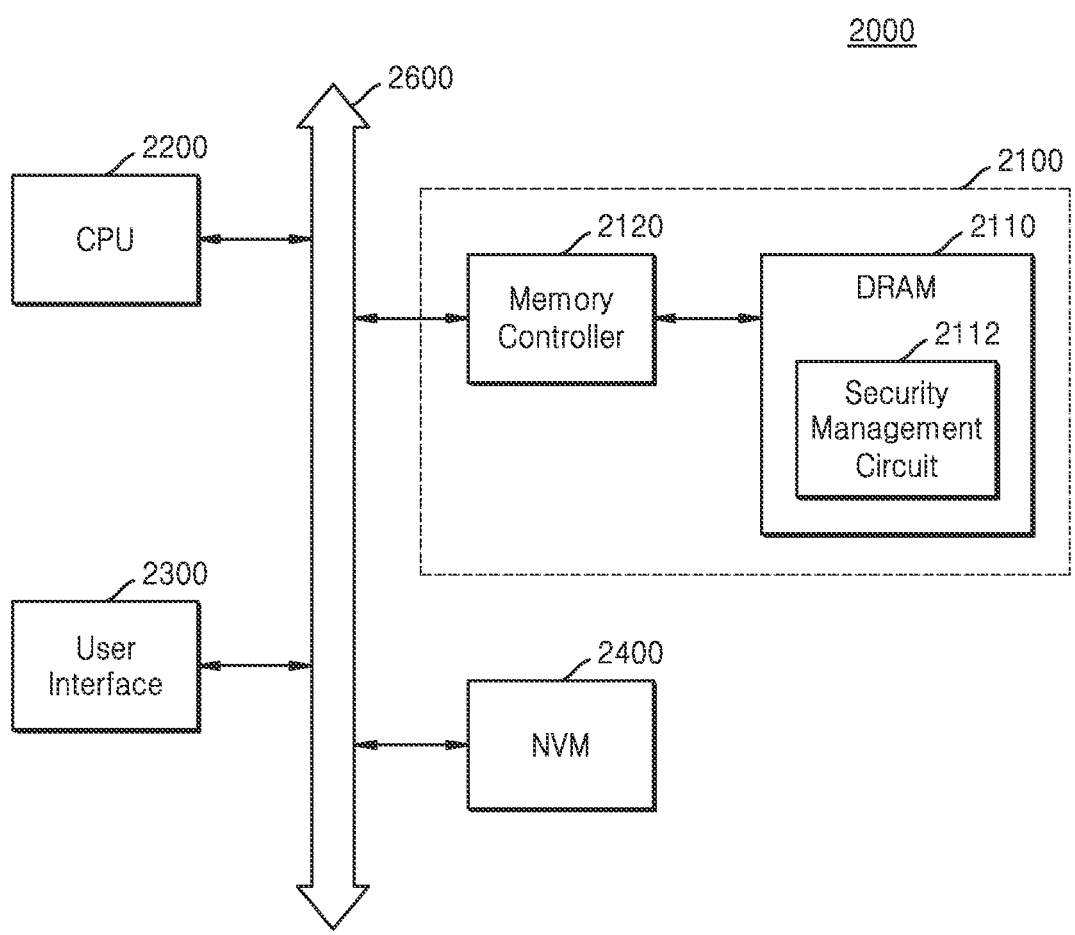
FIG. 16 illustrates a computing system according to an example embodiment of the inventive concepts.

FIG. 16 illustrates a computing system 2000 according to an example embodiment of the inventive concepts. The computing system 2000 may include a memory system 2100, a CPU 2200, a user interface 2300, and a non-volatile storage device 2400, which are electrically connected to a system bus 2600. The memory system 2100, the CPU 2200, the user interface 2300, and the non-volatile storage device 2400 may communicate with each other via the system bus 2600. Although not shown in FIG. 17, the computing system 2000 may further include ports allowing communication with a video card, a sound card, a memory card, a USB device, and the like or communication with other electronic devices. The computing system 2000 may be implemented as a personal computer or as a portable electronic device such as a notebook computer, a mobile phone, a personal digital assistant (PDA), a camera, or the like.

The CPU 2200 may perform particular calculations or tasks. For example, the CPU 2200 may include a microprocessor or a GPU. The CPU 2200 may also be connected to an extended bus such as a peripheral component interconnect (PCI) bus.

The user interface 2300 may include an input means such as a keyboard, a keypad, a mouse, or the like to receive an input signal from a user and may include an output means such as a printer, a display device, or the like to provide an output signal to a user.

For example, the non-volatile storage device 2400 may include a non-volatile memory device, such as electrically erasable programmable read-only memory (EEPROM), flash memory, phase change random access memory (PRAM), resistance random access memory (RRAIVI), nano floating gate memory (NFGM), polymer random access memory (PoRAM), magnetic random access memory (MRAM), and/or ferroelectric random access memory (FRAM), and/or may include a magnetic disk or the like.

The memory system 2100 may include a memory controller 2120 and a DRAM device 2110. The DRAM device 2110 may include a security management circuit 2112. The security management circuit 2112 may have a configuration corresponding to the security management circuit 370 described with reference to FIGS. 1 to 14.

According to an example embodiment, the DRAM device 2110 may include the security management circuit 2112 processing and managing security data, whereby the computing system 2000 may not include a separate processor for a security solution. Therefore, according to an example embodiment, the cost for implementing the computing system 2000 may be reduced.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

Spatially relative terms, such as "beneath," "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of" when preceding a list of elements, modify the entire list of elements and do not modify the individual elements of the list.

In the accompanying drawings, variations from the illustrated shapes as a result, for example, of manufacturing techniques and/or tolerances, are to be expected. Thus, the example embodiments of the inventive concepts should not be construed as being limited to the particular shapes of regions illustrated herein but may be construed to include deviations in shapes that result, for example, from a manufacturing process. For example, an etched region illustrated as a rectangular shape may be a rounded or certain curvature shape. Thus, the regions illustrated in the figures are schematic in nature, and the shapes of the regions illustrated in the figures are intended to illustrate particular shapes of regions of devices and not intended to limit the scope of the present inventive concepts.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

When a certain example embodiment may be implemented differently, a specific process order may be performed differently from the described order. For example, two consecutively described processes may be performed substantially at the same time or performed in an order opposite to the described order.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

While the inventive concepts have been particularly shown and described with reference to embodiments thereof, it will be understood by those skilled in the art that various changes in form and details may be made therein without departing from the spirit and scope of the following claims. In addition, it should be understood that particular terms used herein are only for the purpose of describing the embodiments and are not intended to limit the inventive concepts. Therefore, the scope of the inventive concepts should be defined by the accompanying claims and equivalents thereof.

What is claimed is:

1. A memory device comprising:
a memory cell array; and
a security management circuit configured to enter a memory allocation phase for a security region in response to a first mode signal and a write command that are received through a same command line from a host system including a host and a memory controller, and to allocate a region in the memory cell array to the security region based on a physical address received through an address line from the memory controller, wherein the security management circuit is electrically connected between the memory controller and the memory cell array, and wherein the host is configured to generate a virtual address that corresponds to the security region, and the memory controller is configured to map the virtual address to the physical address and provide the physical address to the security management circuit via the address line,
wherein the security management circuit is further configured to compare a password received from the memory controller with a guard key of the security region, in response to a memory operation command for the security region received from the host system, and to control a data operation for the security region based on a result of the comparison,
wherein the memory cell array comprises the security region and a normal region different from the security region,
wherein the normal region is connected to at least one word line, and the security region is separated from the at least one word line,
wherein the first mode signal is received through the command line before receiving the write command or simultaneously with the receiving of the write command,
wherein the memory device is main volatile memory of the host system, and
wherein the memory device is separated from the host system, and the security management circuit is distinct from the memory controller.

2. The memory device of claim 1, wherein, in the memory allocation phase, the security management circuit is further configured to store region information matching the received physical address in the normal region in the memory cell array, and
the region information comprises at least one of a start address, an end address, or a region size of the security region.

3. The memory device of claim 1, wherein the guard key is stored separately from the memory cell array in the security management circuit.

4. The memory device of claim 1, wherein the host is configured to generate the guard key and transmit the guard key to the memory controller, and
wherein the security management circuit is further configured to receive the guard key from the memory controller in a guard key injection operation or a guard key update operation.

5. The memory device of claim 4, wherein the security management circuit is further configured to enter the guard key injection operation or the guard key update operation in response to a second mode signal received through a command line between the host system and the memory device.

6. The memory device of claim 1, wherein the password is received through a command line between the host system and the memory device.

7. The memory device of claim 1, wherein the security management circuit is further configured to output an alert signal when the result of the comparison indicates that the password does not match the guard key.

8. The memory device of claim 1, wherein the password is a hash of the guard key, or the guard key is a hash of the password.

9. The memory device of claim 1,
wherein the security region comprises data that is secured by the security management circuit, and wherein the normal region comprises data that is not secured by the security management circuit.

10. The memory device of claim 9, wherein, in the memory allocation phase, the security management circuit is further configured to store region information matching the received physical address in the normal region of the memory cell array, and wherein, to determine that the memory operation command is a command for the security region, the security management circuit is further configured to compare the region information with an address provided by the host system.

11. The memory device of claim 10, wherein the security management circuit comprises:

an address comparison circuit configured to, in response to the memory operation command, compare the region information with the address provided by the host system and generate a region comparison result;

a password comparison circuit configured to compare the received password with the guard key and generate a password comparison result; and a security control circuit configured to control the data operation for the security region based on the region comparison result and the password comparison result.

12. The memory device of claim 1, wherein the security region and the normal region are connected to a same bit line.

13. A method of operating a data processing system, the method comprising:

allocating, by a host, a virtual address corresponding to a security region;

converting, by a controller, the virtual address received from the host into a physical address;

allocating, by a memory device, a region in a memory array to the security region based on the physical address received from the controller;

receiving, by the memory device, a data operation command for the security region from the controller;

receiving, by the memory device, a password for the security region from the controller;

comparing, by the memory device, the password with a guard key of the security region;

performing, by the memory device, a data operation for the security region based on a result of the comparison when the comparison indicates that the password matches the guard key;

limiting the data operation by controlling at least one of a column decoder or a row decoder when the comparison indicates that the password does not match the guard key; and limiting the data operation by controlling at least one of the column decoder or the row decoder when the data operation command for the security region has been input to the memory device but the password has not been input, wherein the converting of the virtual address received from the host into the physical address comprises mapping, by the controller, the virtual address to the physical address based on a mapping table, and wherein the memory device is main volatile memory of the host and is separated from the host and the controller.

14. The method of claim 13, wherein the allocating of the security region comprises:

entering, by the memory device, a memory allocation phase for the security region in response to a write command and a first mode signal that are received from the controller; and storing, by the memory device, region information about the security region corresponding to the physical address in a normal region in the memory array.

15. The method of claim 14, wherein the memory device receives the first mode signal through a command line between the controller and the memory device prior to the write command or simultaneously with the write command.

16. The method of claim 13, further comprising:

generating, by the host, the guard key for the security region;

transmitting, by the controller, the guard key received from the host to the memory device; and storing, by the memory device, the guard key in the security region.

17. The method of claim 16, wherein the storing of the guard key in the security region comprises entering, by the memory device, a guard key injection phase or a guard key update phase in response to a second mode signal received from the controller.

18. The method of claim 17, wherein the memory device receives the second mode signal through a command line between the controller and the memory device.

19. A high bandwidth memory (HBM) apparatus which operates as main memory of a host system, the HBM apparatus comprises:

a memory device comprising:
a plurality of core dies comprising a first core die and a second core die that are vertically stacked; and
a buffer die configured to control a data operation with respect to the plurality of core dies and communicatively coupled to a memory controller included in the host system, wherein the first core die is between the buffer die and the second core die, and wherein the memory controller is external to the memory device, wherein the buffer die comprises a security management circuit that is configured to enter a memory allocation phase for a security region of a target core die among the plurality of core dies, and to control the data operation for the security region, wherein, in the memory allocation phase, the security management circuit is further configured to:

allocate a memory region in the target core die to the security region without receiving an address corresponding to the security region from the host system;

generate region information based on a physical address corresponding to the security region that was obtained by allocating the memory region to the security region;

store the region information in a normal region in the target core die different from the security region; and transmit information about the physical address to the memory controller included in the host system, thereby allowing the host system to identify the security region, wherein the memory controller is configured to map the physical address to a virtual address that corresponds to the security region, and wherein the security management circuit is further configured to compare a password received from the host system with a guard key of the security region, in response to a data operation command for the security region received from the host system, and to control the data operation for the security region based on a result of comparing the password with the guard key.

20. The HBM apparatus of claim 19, wherein the region information comprises at least one of a start address, an end address, or a region size of the security region.

* * * * *